(12) United States Patent
Iwata et al.

(10) Patent No.: US 9,639,810 B2
(45) Date of Patent: May 2, 2017

(54) INFORMATION PROCESSING DEVICE, INFORMATION PROCESSING SYSTEM, AND STORAGE MEDIUM STORING INFORMATION PROCESSING PROGRAM

(75) Inventors: Satoru Iwata, Kyoto (JP); Kiyoshi Mizuki, Kyoto (JP); Kei Uramoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 2035 days.

(21) Appl. No.: 11/976,247

(22) Filed: Oct. 23, 2007

(65) Prior Publication Data

US 2009/0062010 A1 Mar. 5, 2009

(30) Foreign Application Priority Data

Aug. 27, 2007 (JP) ................................. 2007-219497

(51) Int. Cl.
*G06F 17/00* (2006.01)
*G06Q 10/00* (2012.01)
*G06Q 30/02* (2012.01)

(52) U.S. Cl.
CPC ............ *G06Q 10/00* (2013.01); *G06Q 30/02* (2013.01)

(58) Field of Classification Search
CPC ................................. G06Q 30/02; G06Q 10/00
See application file for complete search history.

(56) References Cited

U.S. PATENT DOCUMENTS

| | | |
|---|---|---|
| 2002/0032776 A1 | 3/2002 | Hasegawa et al. |
| 2003/0069069 A1 | 4/2003 | Kinjo et al. |
| 2004/0142751 A1 | 7/2004 | Yamagami |
| 2006/0128471 A1* | 6/2006 | Willis et al. ..................... 463/42 |
| 2006/0271620 A1 | 11/2006 | Beaty et al. |
| 2007/0054738 A1* | 3/2007 | Muir ................................ 463/42 |
| 2007/0072678 A1* | 3/2007 | Dagres ............................ 463/42 |
| 2007/0182989 A1* | 8/2007 | Harada ........................ 358/1.15 |
| 2007/0225076 A1* | 9/2007 | Aida ............................... 463/42 |

(Continued)

FOREIGN PATENT DOCUMENTS

| | | |
|---|---|---|
| EP | 1 538 838 | 6/2005 |
| EP | 1 757 345 | 2/2007 |
| JP | 9-171504 | 6/1997 |

(Continued)

OTHER PUBLICATIONS

European Office Action issued for corresponding European Patent Application No. 07020580.2-2221, dated May 3, 2012.

*Primary Examiner* — Abdullahi E Salad
(74) *Attorney, Agent, or Firm* — Nixon & Vanderhye, P.C.

(57) ABSTRACT

An information processing device performs data communication with a server through a predetermined network, and transmits a result of reviewing a review target to the server. The information processing device executes, in accordance with an operation of a user, execution processing of any review target which is selected from a plurality of review targets, and updates and stores an execution history of the review target. The information processing device extracts a reviewable review target from the plurality of review targets based on the stored execution history of each review target. The information processing device generates review information reviewing at least one extracted review target in accordance with an operation of the user, and transmits the review information to the server.

22 Claims, 20 Drawing Sheets

(56) References Cited

U.S. PATENT DOCUMENTS

2011/0252483 A1* 10/2011 Cross et al. .................. 726/28

FOREIGN PATENT DOCUMENTS

| | | |
|---|---|---|
| JP | 2002-92261 | 3/2002 |
| JP | 2002-215523 | 8/2002 |
| JP | 2003-103044 | 4/2003 |
| JP | 2003-196351 | 7/2003 |
| JP | 2004-139318 | 5/2004 |
| WO | WO 00/27124 | 5/2000 |

* cited by examiner

| OPERATION INFORMATION DATA | ～Da |
| RANKING DATA | ～Db |
| PLAY HISTORY FILE DATA | ～Dc |
| POSTING LIST DATA | ～Dd |
| POSTING TRANSMISSION INFORMATION DATA | ～De |
| SOFTWARE POSTING BREAKDOWN DATA | ～Df |
| IMAGE DATA | ～Dg |

Fph

PLAY HISTORY FILE

| GAME SOFTWARE TITLE | GAME SOFTWARE A |
|---|---|
| GAME SOFTWARE CODE | A A A A A A |
| PLAY START DATE AND TIME | 2007.1.1 7:00 ～ |
| PLAY TIME | 25 MINUTES |

FIG. 11 

POSTING LIST

| GAME SOFTWARE TITLE | GAME SOFTWARE CODE | TOTAL PLAY TIME | POSTED FLAG |
|---|---|---|---|
| GAME SOFTWARE A | A A A A A | 45 MINUTES | OFF |
| GAME SOFTWARE D | D D D D D | 5 HOURS 30 MINUTES | ON |
| GAME SOFTWARE Q | Q Q Q Q Q | 2 HOURS 10 MINUTES | OFF |
| GAME SOFTWARE S | S S S S S | 10 MINUTES | OFF |
| GAME SOFTWARE B | B B B B B | 1 HOUR 50 MINUTES | OFF |
| GAME SOFTWARE E | E E E E E | 15 HOURS 00 MINUTE | ON |
| GAME SOFTWARE C | C C C C C | 3 HOURS 55 MINUTES | OFF |
| ⋮ | ⋮ | ⋮ | ⋮ |

FIG. 12 

POSTING TRANSMISSION INFORMATION

| GAME APPARATUS SERIAL NUMBER | 1 2 3 4 5 6 |
|---|---|
| GAME SOFTWARE CODE | Q Q Q Q Q |
| TOTAL PLAY TIME | 2 HOURS 10 MINUTES |
| POSTED CONTENTS Q1 | 1 |
| POSTED CONTENTS Q2 | 3 5 |
| POSTED CONTENTS Q3 | 6 5 |
| POSTED CONTENTS Q4 | 2 |
| POSTED CONTENTS Q5 | 2 |
| ⋮ | ⋮ |

INFORMATION PROCESSING DEVICE, INFORMATION PROCESSING SYSTEM, AND STORAGE MEDIUM STORING INFORMATION PROCESSING PROGRAM

CROSS REFERENCE TO RELATED APPLICATION

The disclosure of Japanese Patent Application No. 2007-219497, filed on Aug. 27, 2007, is incorporated herein by reference.

BACKGROUND OF THE INVENTION

Field of the Invention

The present invention relates to an information processing device, an information processing system, and a storage medium storing an information processing program for reviewing various review targets.

Description of the Background Art

Conventionally, there has been known a system for reviewing game software, books, music software, and the like on a website or the like. For example, Japanese Laid-Open Patent Publication No. 9-171504 (hereinafter referred to as Patent Document 1) discloses an information processing device in which a user reviews an applied product exhibited by an information provider and gives a score to it, and then sends a review result to the server of the information provider through the Internet thereby to reflect the review result in a ranking of applied products which is exhibited by the information provider. More specifically, in the information processing device disclosed in the Patent Document 1, a screen is displayed in which books, CDs and the like are introduced by the information provider, and a user clicks on a "vote" button provided on the screen for inputting a review of a book, a CD, or the like.

Also, Japanese Laid-Open Patent Publication No. 2002-215523 (hereinafter referred to as Patent Document 2) discloses a system which causes a review of the product to be inputted after a product is viewed. More specifically, in the system disclosed in the Patent Document 2, a server exhibits a product review site on a network. A user of an information terminal on the network views a product ranking list exhibited in the product review site, and selects a product with the information terminal. The server reads and transmits data of the selected product to the information terminal. Then, when the user finishes viewing the product at the information terminal and selects an End button, display data of a review input screen is transmitted to the information terminal.

In the information processing device disclosed in the Patent Document 1, however, anyone can review the product regardless of whether or not a product is actually viewed or listened to. Thus, there is a problem that reliability of reviewing is poor.

Also, in the information processing device disclosed in the Patent Document 2, a product can be reviewed only after viewing the product has been finished. Thus, it is possible to obtain a review which is made by a user who has viewed the product to the end. However, such a review method is effective for a product which is viewed to the end for a relatively short time but not effective for a product such as a game, a voluminous book, or the like which takes a lot of time to play or view. For example, in order to cause a product to become reviewable using the system disclosed in the Patent Document 2, the user expends a lot of energy, and a lot of burden is imposed on the user. Meanwhile, there is a case that even though a product is not played or viewed to the end, it is possible to reasonably review the product at a stage when the product is played or viewed to some extent. In this case, however, the product cannot be reviewed with the system of the Patent Document 2. In addition, in the case of a game, there could be a case that a user gives up the game during playing and does not reach the end. Thus, there is a problem that it is hard to obtain a sufficient number of review samples.

SUMMARY OF THE INVENTION

Therefore, an object of the present invention is to provide an information processing device, an information processing system, a storage medium storing an information processing program, which achieve ease and reliability of reviewing a review target.

The present invention has the following features to attain the object mentioned above. It is noted that reference numerals and step numbers in parentheses are merely provided to facilitate the understanding of the present invention in relation to the later-described embodiment, rather than limiting the scope of the present invention in any way.

A first aspect of the present invention is directed to an information processing device (5) for performing data communication with a server (9) through a predetermined network and transmitting a result of reviewing a review target to the server. The information processing device comprises review target execution means (a CPU 10 which executes step 51; hereinafter, only step numbers are described), execution history administration means (S50, S55, S57, S59, S61, S62, Dc, Dd), reviewable target extraction means (S82), review information generation means (S85 to S87), and transmission means (S89). The review target execution means executes, in accordance with an operation of a user, execution processing of any review target which is selected from a plurality of review targets. The execution history administration means updates and stores an execution history (a total play time, a total number of play times, an extent) of the review target in accordance with the execution processing of the review target by the review target execution means. The reviewable target extraction means extracts a reviewable review target from the plurality of review targets based on the execution history of each review target stored by the execution history administration means. The review information generation means generates, in accordance with an operation of the user, review information (Itp) reviewing at least one review target extracted by the reviewable target extraction means. The transmission means transmits to the server the review information generated by the review information generation means.

It is noted that the review target includes various media, and media data such as music data, video data, electronic book data, still image data, and the like in addition to various application programs such as a game program, an information processing program, a browser, and the like. The execution history of the execution processing of these review targets includes an execution time, a number of execution times, an execution extent, and the like, of processing for executing a program, and an execution time, a number of execution times, an execution extent, and the like, of processing for playing each data. Further, these review targets are supplied to the information processing device through a wired or wireless communication line in addition to from an external storage medium such as an optical disc-shaped storage medium, a nonvolatile semiconductor memory, and the like, and an internal storage medium such as a nonvolatile storage unit, and the like. The review target also includes a website which is browsable from the information processing device through a network, and the like. The execution history of the execution processing of these review targets also includes an execution time, a number of execution times, an execution extent, and the like, of processing for browsing a website.

In a second aspect of the present invention based on the first aspect, the execution history administration means updates and stores the execution history of the review target in accordance with an execution time for which the review target execution means has executed the execution processing of the review target. The reviewable target extraction means extracts from the plurality of review targets a review target the execution time of which, stored by the execution history administration means, has reached a predetermined time as the reviewable review target.

In a third aspect of the present invention based on the first aspect, the execution history administration means updates and stores the execution history of the review target in accordance with a number of execution times which the review target execution means has executed the execution processing of the review target. The reviewable target extraction means extracts from the plurality of review targets a review target the number of execution times of which stored by the execution history administration means has reached a predetermined number of times as the reviewable review target.

In a fourth aspect of the present invention based on the first aspect, the execution history administration means updates and stores the execution history of the review target in accordance with an extent to which the review target execution means has executed the execution processing of the review target. The reviewable target extraction means extracts from the plurality of review targets a review target the extent of which stored by the execution history administration means has reached a predetermined extent as the reviewable review target.

In a fifth aspect of the present invention based on the first aspect, the information processing device further comprises reviewed target administration means (S89, Dd). The reviewed target administration means distinguishes the review target the review information of which has been transmitted by the transmission means as a reviewed target (posted flag). The reviewable target extraction means extracts the reviewable review target from the plurality of review targets except the reviewed target.

In a sixth aspect of the present invention based on the fifth aspect, the information processing device further comprises receiving means (S81). The receiving means receives from the server a review acceptance list (a review target full list) describing a review target review information of which is to be accepted. The reviewable target extraction means extracts from the plurality of review targets a review target which is described in the review acceptance list and which is not the reviewed target, and extracts the reviewable review target from the extracted review target based on the execution history of each review target.

In a seventh aspect of the present invention based on the first aspect, the information processing device further comprises review target display control means (S83). The review target display control means displays the review target extracted by the reviewable target extraction means on a display unit (2) to prompt the user to make a selection from the displayed review target.

In an eighth aspect of the present invention based on the first aspect, the review information generation means generates the review information so as to include the execution history of the review target which has been stored by the execution history administration means at the time of generating the review information of the review target.

A ninth aspect of the present invention is directed to an information processing system comprising a server and a plurality of information processing devices which perform data communication through a predetermined network for transmitting a result of reviewing a review target from each information processing device to the server. Each of the information processing devices comprises review target execution means and execution history administration means. The review target execution means executes, in accordance with an operation of a user, execution processing of any review target which is selected from a plurality of review targets. The execution history administration means updates and stores an execution history of the review target in accordance with the execution processing of the review target by the review target execution means. One of each of the information processing devices and the server comprises reviewable target extraction means. The reviewable target extraction means extracts a reviewable review target from the plurality of review targets based on the execution history of each review target stored by the execution history administration means. Each of the information processing devices further comprises review information generation means and client side transmission means. The review information generation means generates, in accordance with an operation of the user, review information reviewing at least one review target extracted by the reviewable target extraction means. The client side transmission means transmits to the server the review information generated by the review information generation means. The server comprises server side receiving means (a CPU of a server 9 which executes step 113; hereinafter, only step numbers are described) and data exhibition means (S123, S125). The server side receiving means receives the review information transmitted from each of the information processing devices. The data exhibition means accumulates the review information received by the server side receiving means, and exhibits data (ranking data, software posting breakdown data) indicating a result of the accumulation to the information processing device.

In a tenth aspect of the present invention based on the ninth aspect, the review information generation means generates the review information so as to include an identification code (a game apparatus serial number) which identifies the information processing device. The server further comprises review history storage means (S116, a posting history list), determination means (S114), and review information acceptance means (S117). The review history storage means stores a review history list which describes at least a combination of the review target of the review information received by the server side receiving means and the identification code included in the review information. The determination means determines whether or not the combination of the review target of the review information received by the server side receiving means and the identification code included in the review information is included in the review history list. The review information acceptance means accepts the review information received by the server side receiving means when the determination means determines that the combination is not included in the review history list, and refuses the review information received by the server side receiving means when the determination means determines that the combination is included in the review history list. The data exhibition means accumulates the review information accepted by the review information acceptance means, and exhibits data indicating a result of the accumulation to the information processing device.

In an eleventh aspect of the present invention based on the ninth aspect, the review information generation means generates the review information so as to include the execution history of the review target which has been stored by the execution history administration means at the time of generating the review information of the review target. The data exhibition means exhibits to the information processing device, along with the result of the accumulation, data indicating a result of accumulating the execution history included in each review information which leads the result of the accumulation.

In a twelfth aspect of the present invention based on the ninth aspect, the server further comprises review acceptance list administration means (S112). The review acceptance list administration means updates and administrates as appropriate a review acceptance list which describes a review target, review information of which is to be accepted by the server. The reviewable target extraction means extracts from the plurality of review targets the review target described in the review acceptance list, and extracts the reviewable review target from the extracted review target based on the execution history of each review target.

A thirteenth aspect of the present invention is directed to a storage medium storing an information processing program executed by a computer (10) of a device which performs data communication with a server through a predetermined network and transmits a result of reviewing a review target to the server. The information processing program causing the computer to operate as review target execution means, execution history administration means, reviewable target extraction means, review information generation means, and transmission means. The review target execution means executes, in accordance with an operation of a user, execution processing of any review target which is selected from a plurality of review targets. The execution history administration means updates and stores in a memory an execution history of the review target in accordance with the execution processing of the review target by the review target execution means. The reviewable target extraction means extracts a reviewable review target from the plurality of review targets based on the execution history of each review target stored by the execution history administration means. The review information generation means generates, in accordance with operation of the user, review information reviewing at least one review target extracted by the reviewable target extraction means. The transmission means transmits to the server the review information generated by the review information generation means.

According to the first aspect, a reviewable review target can be reviewed, and review information thereof can be transmitted to the server. When the user of the information processing device reviews a review target, a reviewable review target is extracted based on the execution history of the review target. This achieves ease and reliability of reviewing.

According to the second aspect, when the user of the information processing device reviews a review target, a review target which has been executed for a time which is equal to or longer than a predetermined time is extracted as a reviewable review target. For example, in the case where the review target is a game program, only a game program which has been played by a player for a total play time which is equal to or longer than a predetermined time becomes reviewable. This achieves ease and reliability of reviewing.

According to the third aspect, when the user of the information processing device reviews a review target, a review target which has been executed a number of times which is equal to or larger than a predetermined number of times is extracted as a reviewable review target. For example, in the case where the review target is a game program, only a game program which has been played by the player a number of times which is equal to or larger than a predetermined number of times becomes reviewable. This achieves ease and reliability of reviewing.

According to the fourth aspect, when the user of the information processing device reviews a review target, a review target which has been executed to an extent which is equal to or larger than a predetermined extent is extracted as a reviewable review target. For example, in the case where the review target is a game program, only a game program which has been played by the player to an extent which has reached a predetermined extent corresponding to a midstream with respect to an entire process from a time when the player starts playing the game program to a time when a game is cleared becomes reviewable. This achieves ease and reliability of reviewing.

According to the fifth aspect, when the user reviews a review target, since a limitation is set to a number of times of reviewing, intentional mass posting is prevented, thereby improving reliability of reviewing (posting). Since the information processing device as a review source excludes a reviewed review target, the limitation to the number of times of reviewing is notified to the user, thereby preventing the player from uselessly making review.

According to the sixth aspect, a list indicating a review target review information of which is to be accepted is transmitted from the server, only a review target described in the list becomes reviewable. Thus, the server can exclude a review target a review of which is not desired by the server, and it is possible to make review on a client side in comply with a host side's intent.

According to the seventh aspect, it is possible for the user to know a reviewable target easily.

According to the eighth aspect, the server which receives review information can obtain an execution history of each received review information. Thus, it is possible to know reliability of the review information.

According to the information processing system and the storage medium storing the information processing program of the present invention, the same advantageous effects as the above-described information processing device are obtained.

In addition, according to the tenth aspect, a limitation is set to a number of times of reviewing when the user of each information processing device sends a result of reviewing a review target, and the identical review target is prevented from being reviewed from the identical information processing device many times. Thus, intentional mass posting is prevented, thereby improving reliability of reviewing. Even if data of a number of times of reviewing in the information processing device is manipulated, reviewing becomes invalid by checking and limiting the number of times of reviewing by the server. Thus, dishonest reviewing is prevented.

In addition, according to the eleventh aspect, the user of the information processing device can view the execution history at the time of reviewing by each reviewer as well as the result of the accumulation of the review by the server. Thus, the user can determine after how long the review target has been executed the review contents are made, and can know reliability of the review content.

These and other objects, features, aspects and advantages of the present invention will become more apparent from the following detailed description of the present invention when taken in conjunction with the accompanying drawings.

BRIEF DESCRIPTION OF THE DRAWINGS

FIG. 9 shows an example of main data stored in a main memory and a flash memory 17 of the game apparatus main body 5;

FIG. 10 shows an example of a play history file Fph stored in play history file data Dc;

FIG. 11 shows an example of a posting list Lpos stored in posting list data Dd;

FIG. 12 shows an example of posting transmission information Itp stored in posting transmission information data De;

DESCRIPTION OF THE PREFERRED EMBODIMENTS

Figure 1:
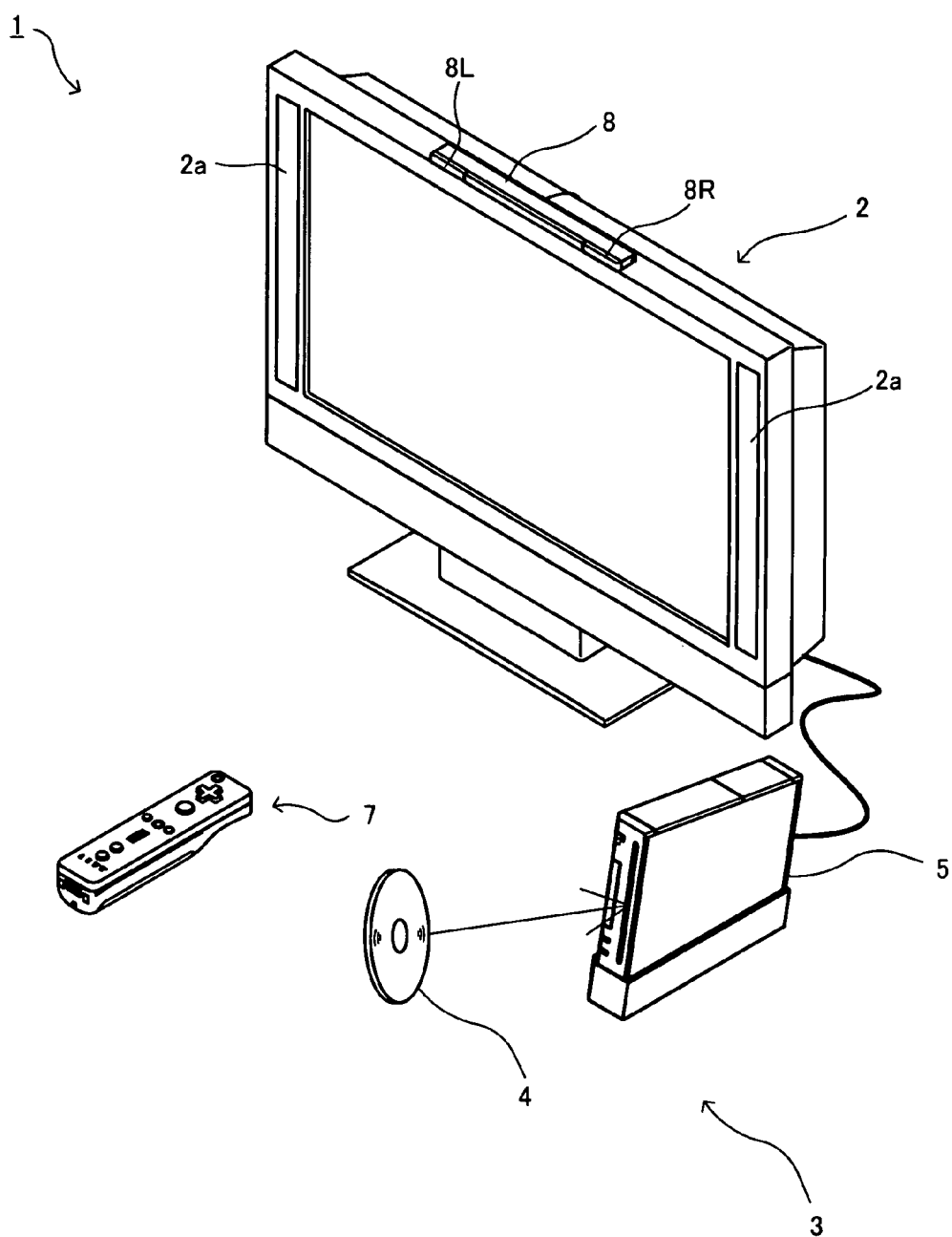
FIG. 1 is an external view illustrating a game system 1 according to an embodiment of the present invention.
Figure 5:
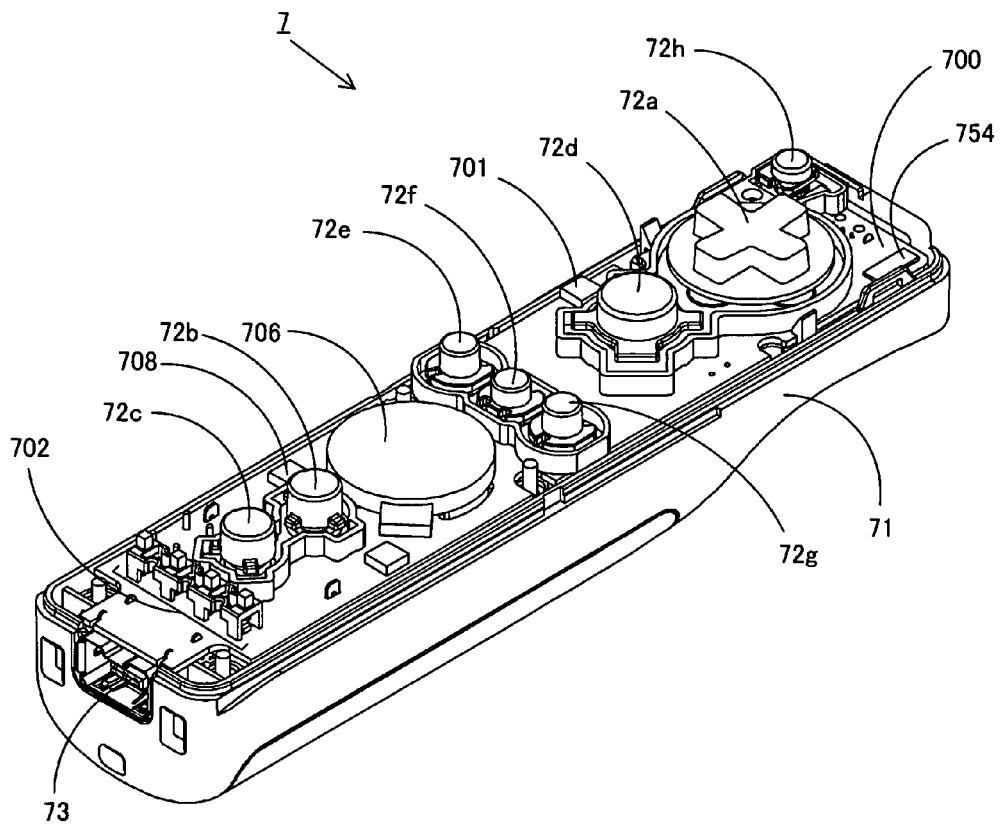
FIG. 5 is a perspective view illustrating a state where an upper housing of the controller 7 of FIG. 3 is removed.

With reference to FIG. 1, the following will describe a device for executing an information processing program according to an embodiment of the present invention. Hereinafter, a game system including a stationary game apparatus main body 5 as an example of the device will be described in detail. FIG. 1 is an external view illustrating the game system 1 including a stationary game apparatus 3, and FIG. 5 is a block diagram of the game apparatus main body 5. The game system 1 will be described below.

As shown in FIG. 1, the game system 1 comprises a home-use television receiver (hereinafter, referred to as a monitor) 2 as an example of display means, the stationary game apparatus 3 connected to the monitor 2 through a connecting cord. The monitor 2 includes a pair of speakers 2a for audio-outputting audio signals outputted from the game apparatus main body 5. The game apparatus 3 includes an optical disc 4 storing a game program as an example of the information processing program of the present invention, the game apparatus main body 5 provided with a computer for executing the game program of the optical disc 4 to display a game screen on the monitor 2, and a controller 7 for providing the game apparatus main body 5 with operational information which is required for a game and which operates a character and the like displayed in the game screen.

Figure 2:
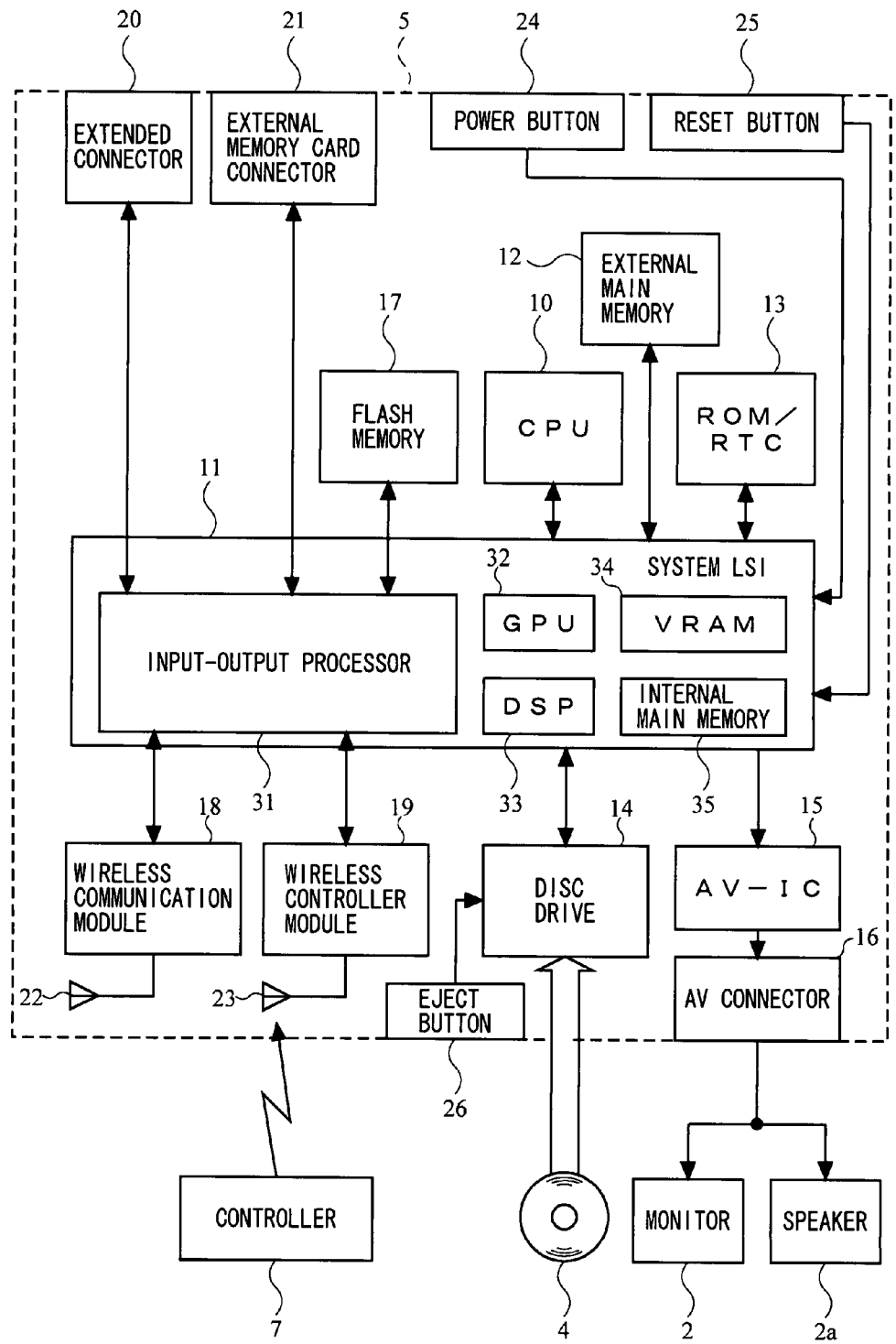
FIG. 2 is a functional block diagram of a game apparatus main body 5 shown in FIG. 1.

The game apparatus main body 5 includes therein a wireless controller module 19 (see FIG. 2). The wireless controller module 19 receives data transmitted wirelessly from the controller 7, and transmits data from the game apparatus main body 5 to the controller 7, so that the game apparatus main body 5 and the controller 7 are connected to each other by radio communication. Further, the optical disc 4 as an example of an exchangeable information storage medium is detachably mounted to the game apparatus main body 5

The game apparatus main body 5 includes a flash memory 17 (see FIG. 2) functioning as a backup memory to store data such as various data described later, saved data obtained by game software processing, and the like in a fixed manner. The game apparatus main body 5 executes the game program and the like stored in the optical disc 4, and displays the result as a game screen on the monitor 2. The game apparatus main body 5 may execute a game program stored in advance in the flash memory 17, instead of the game program and the like stored in the optical disc 4. In addition, the game apparatus main body 5 re-cerates a game state which has been executed previously using saved data stored in the flash memory 17, and displays a game screen on the monitor 2. A player of the game apparatus main body 5 operates the controller 7 while watching a game screen displayed on the monitor 2, and enjoys game process.

By using the technology of, for example, Bluetooth (registered trademark), the controller 7 wirelessly transmits transmission data such as the operation information and the like to the game apparatus main body 5 including the wireless controller module 19. The controller 7 is operation means for mainly operating an object and the like displayed in a display screen of the monitor 2. The controller 7 includes a housing whose size is small enough to be held by one hand, and a plurality of operation buttons (including a cross key, a stick, and the like) provided on a surface of the housing. As described later in detail, the controller 7 also includes an imaging information calculation section 74 for taking an image viewed from the controller 7. As exemplary imaging targets of the imaging information calculation section 74, two LED modules 8L and 8R (hereinafter, referred to as markers) are provided in the vicinity of the display screen of the monitor 2. The markers 8L and 8R each output an infrared light forward from the monitor 2. The controller 7 also receives at a communication section 75 transmission data transmitted wirelessly from the wireless controller module 19 of the game apparatus main body 5, and produces sound and vibration according to the transmission data.

The following will describe an internal structure of the game apparatus main body 5 with reference to FIG. 2. FIG. 2 is a block diagram of the game apparatus main body 5. The game apparatus main body 5 includes a CPU (Central Processing Unit) 10, a system LSI (Large Scale Integration) 11, an external main memory 12, a ROM/RTC (Read Only Memory/Real Time Clock) 13, a disc drive 14, and an AV-IC (Audio Video-Integrated Circuit) 15.

The CPU 10 executes game processing by executing the game program stored in the optical disc 4, and functions as a game processor. The CPU 10 is connected to the system LSI 11. In addition, the external main memory 12, the ROM/RTC 13, the disc drive 14, and the AV-IC 15 are connected to the system LSI 11. The system LSI 11 performs processing such as control of data transmission between the system LSI 11 and each component connected thereto, generation of an image to be displayed, obtaining data from an external device, and the like. The internal structure of the system LSI will be described later. The volatile external main memory 12 stores a program such as the game program read from the optical disc 4, the game program read from a flash memory 17, and the like, and various data, and is used as a work region and a buffer region for the CPU 10. The ROM/RTC 13 includes a ROM (so-called boot ROM) which stores a program for starting up the game apparatus main body 5, and a clock circuit (RTC) for counting time. The disc drive 14 reads program data and texture data from the optical disc 4, and writes these data into an internal main memory 35, which will be described later, or the external main memory 12.

The system LSI 11 is provided with an input-output processor 31, a GPU (Graphics Processing Unit) 32, a DSP (Digital Signal Processor) 33, a VRAM (Video RAM) 34, and the internal main memory 35. Although not shown in the drawings, these components 31 to 35 are connected to each other through an internal bus.

The GPU 32 is a part of drawing means, and generates an image according to a graphics command (command for generating graphics) from the CPU 10. The VRAM 34 stores data, such as polygon data, texture data, and the like, which are required for the GPU 32 to execute the graphics command. In generating an image, the GPU 32 creates the image data using the data stored in the VRAM 34.

The DSP 33 functions as an audio processor, and generates audio data using sound data and sound waveform (tone color) data which are stored in the internal main memory 35 and the external main memory 12. Like the external main memory 12, the internal main memory 11e stores a program and various data, and is used as a work region and a buffer region for the CPU 10. In outputting sound from the speaker 2a, the DSP 33 reads the sound data, and causes the speaker 2a of the monitor 2 to output sound through the AV-IC 15 and an AV connector 16. In outputting sound from a speaker 706 (see FIG. 7) built in the controller 7, the DSP 33 reads the sound data, transmits audio data to the controller 7 through the wireless controller module 19 and an antenna 23.

The image data and the sound data generated thus are read by the AV-IC 15. The AV-IC 15 outputs the image data to the monitor 2 through the AV connector 16, and the sound data to a speaker 2a built in the monitor 2. Thus, an image is displayed on the monitor 2, and sound is outputted from the speaker 2a.

The input-output processor (I/O process) 31 performs transmission and reception of data to and from each component connected to the input-output processor 31, and downloads data from an external device. The input-output processor 31 is connected to the flash memory 17, a wireless communication module 18, the wireless controller module 19, an extended connector 20, and an external memory card connector 21. An antenna 22 is connected to the wireless communication module 18, and the antenna 23 to the wireless controller module 19.

The input-output processor 31 is connected to a network through the wireless communication module 18 and the antenna 22, so that the input-output processor 31 is communicable to another game apparatus connected to the network and various servers. The input-output processor 31 periodically accesses the flash memory 17 to detect whether there are data required to be transmitted to the network. If there are such data, the input-output processor 31 transmits the data to the network through the wireless communication module 18 and the antenna 22. The input-output processor 31 receives data transmitted from the other game apparatus and data downloaded from a download server through the network, the antenna 22 and the wireless communication module 18, and stores the received data in the flash memory 17. The CPU 10 reads the data stored in the flash memory 17 by executing the game program, and uses the data in execution operations of the game program and the information processing program. In addition to the data transmitted or received between the game apparatus main body 5 and the other game apparatus and various servers, the flash memory 17 may store saved data (result data or midstream data of the game) of the game played using the game apparatus main body 5.

The input-output processor 31 receives operation data transmitted from the controller 7 through the antenna 23 and the wireless controller module 19, and stores (temporarily stores) the operation data in the buffer region of the internal main memory 35 or the external main memory 12. It is noted that like the external main memory 12, the internal main memory 35 may store a program such as the game program read from the optical disc 4, the game program read from the flash memory 17, and the like, and various data, and may be used as a work region and a buffer region for the CPU 10.

The extended connector 20 and the external memory card connector 21 are connected to the input-output processor 31. The extended connector 20 is a connector for an interface such as USB and SCSI, and the communication to the network is enabled by connecting a medium such as an external storage medium, a peripheral device such another controller, or a wired connector for communication to the extended connector 20 instead of the wireless communication module 18. The external memory card connector 21 is a connector for connecting thereto an external storage medium such as a memory card. For example, the input-output processor 31 accesses the external storage medium through the extended connector 20 and the external memory card connector 21 for storing data and reading data.

The game apparatus main body 5 is provided (e.g. at its front main surface) with a power button 24 for the game apparatus main body 5, a reset button 25 for the game processing, a slot through which the optical disc 4 is mounted and dismounted, and an eject button 26 for ejecting the optical disc 4 through the slot. The power button 24 and the reset button 25 are connected to the system LSI 11. When the power button 24 is turned on, electric power is supplied to each component of the game apparatus main body 5 through an AC adaptor (not shown). In the state where the power has been turned on, the power button 24 is pressed to shift to a low power standby mode. Even in the low power standby mode, electric power is supplied to the game apparatus main body 5. Thus, the game apparatus main body 5 can be always connected to a network such as the Internet. It is noted that in turning off the power once the power is turned on, the power button 24 is pressed for a predetermined period of time or longer to turn off the power. The reset button 25 is pressed to make the system LSI 11 restart a boot program of the game apparatus main body 5. The eject button 26 is connected to the disc drive 14. The eject button 26 is pressed to eject the optical disc 4 from the disc drive 14.

The following will describe types of communication performed by the game apparatus main body 5 with another device (the other game apparatus and a server). There are mainly two types of such communication. One of them is communication (hereinafter referred to as constant connection usage type communication) using a constant connection type network, which is performed even in the above low power standby mode. The other of them is communication (hereinafter referred to as occasional connection type communication) depending on an application program such as a communication type match-up game and the like, in which communication control is performed each time according to need. In the constant connection usage type communication, the input-output processor 31 independently transmits the transmission data written into the flash memory 17 as described above, regardless of processing by various programs such as the later-described game program and the like. The data received or downloaded through the antenna 22 and the wireless communication module 18 is written into the flash memory 17. Thus, an application using the constant connection usage type communication (e.g. a mail application, an application for performing posting of the later-described game program, and the like) only has to write into the flash memory 17 data which is desired to transmit, and to read received data from the flash memory 17. When the constant connection usage type communication is used, even in the low power standby mode, communication can be periodically performed. In addition, even when a certain game program is executed, communication can be performed as a process of its background. It is noted that in the embodiment, later-described communication with a server 9 uses the constant connection usage type communication to transmit and receive various data, which will be described later in detail.

Figure 3:
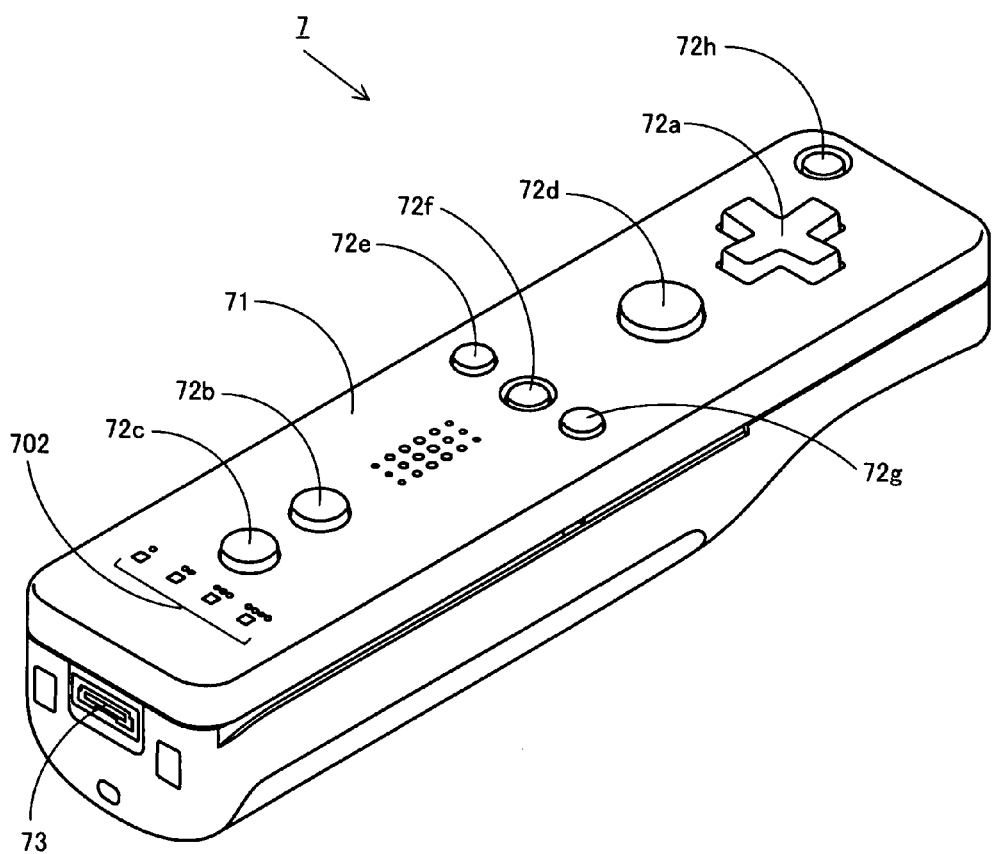
FIG. 3 is a perspective view of a controller 7 of FIG. 1 seen from a top rear side thereof.
Figure 4:
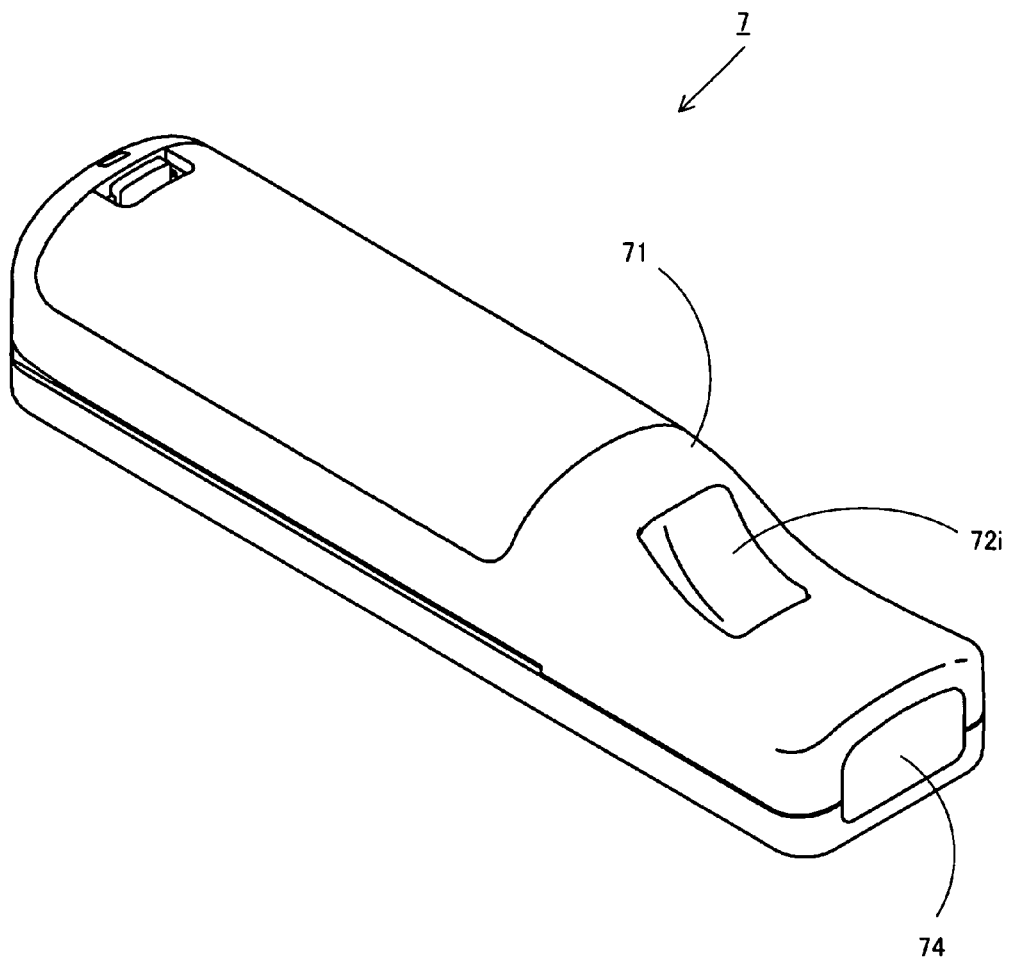
FIG. 4 is a perspective view of the controller 7 of FIG. 3 seen from a bottom front side thereof.

The following will describe the controller 7 with reference to FIGS. 3 and 4. FIG. 3 is a perspective view of a controller 7 seen from a top rear side thereof, and FIG. 4 is a perspective view of the controller 7 seen from a bottom front side thereof.

As shown in FIGS. 3 and 4, the controller 7 includes the housing 71 which is formed by plastic molding, and a plurality of operation sections 72 are provided on the housing 71. The housing 71 has a generally parallelepiped shape extending in a longitudinal direction from front to rear. The overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes operation portions corresponding to four directions (front, rear, right and left), which are respectively located on cross-shaped projecting portions arranged at intervals of 90 degrees. The player selects one of the front, rear, right and left directions by pressing one of the operation portions of the cross key 72a. Through an operation of the cross key 72a, the player can, for example, indicate a direction in which a player character or the like appearing in a virtual game world is to move, or select an option from a plurality of options.

The cross key 72a is an operation section for outputting an operation signal in accordance with the above-described direction input operation performed by the player. Such an operation section may be provided in another form. For example, the cross key 72a may be replaced with an operation section which includes four push switches arranged in a square and which outputs an operation signal in accordance with the push button pressed by the player. In addition to the four push switches of the operation section, a center switch may be provided at the center of the four push switches to form a composite operation section including the four push switches and the center switch. Alternatively, the cross key 72a may be replaced with an operation section which includes an inclinable stick (or joystick) projecting from a top surface of the housing 71 and which outputs an operation signal in accordance with an inclining direction of the stick. Still alternatively, the cross key 72a may be replaced with an operation section which includes a disc-shaped member horizontally slidable and which outputs an operation signal in accordance with a sliding direction of the disc-shaped member. Still alternatively, the cross key 72a may be replaced with a touch pad.

Behind the cross key 72a on the top surface of the housing 71, a plurality of operation buttons 72b to 72g are provided. The operation buttons 72b to 72g are each an operation section for, when the player presses a head thereof, outputting a corresponding operation signal. For example, functions as a number one button, a number two button and an A button are assigned to the operation buttons 72b to 72d, respectively. Also, functions as a minus button, a home button and a plus button are assigned to the operation buttons 72e to 72g, respectively. Operation functions are assigned to the operation buttons 72b to 72g in accordance with the game program executed by the game apparatus main body 5. In an exemplary arrangement shown in FIG. 3, the operation buttons 72b to 72d are arranged in a line at the center in a front-rear direction on the top surface of the housing 71. The operation buttons 72e to 72g are arranged on the top surface of the housing 71 in a line in a left-right direction between the operation buttons 72b and 72d. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for turning on and off the power to the game apparatus main body 5 by remote control. The operation button 72h also has a top surface thereof buried in the top surface of the housing 71, so as not to be inadvertently pressed by the player.

Behind the operation button 72c on the top surface of the housing 71, a plurality of LEDs 702 are provided. A controller type (number) is assigned to the controller 7 such that the controller 7 is distinguishable from the other controllers 7. Here, the LEDs 702 are used for, e.g., informing the player of the controller type which is currently set for the controller 7. More specifically, signal for lighting up one of the plurality of LEDs 702 which corresponds to the controller type of the controller 7 is transmitted from the wireless controller module 19 to the controller 7.

On the top surface of the housing 71, a plurality of holes is provided between the operation button 72b and the operation buttons 72e to 72g for emitting sound from a speaker (the speaker 706 in FIG. 5), which will be described later, to the outside therethrough.

On a bottom surface of the housing 71, a recessed portion is formed. The recessed portion is formed in a position in which an index finger or middle finger of the player is located when the player holds the controller 7 such that the front surface thereof faces the makers 8L and 8R. On a slope surface of the recessed portion, an operation button 72i is provided. The operation button 72i is an operation section functioning as, for example, a B button.

On a front surface of the housing 71, an image pickup element 743 constituting a part of the imaging information calculation section 74 is provided. The imaging information calculation section 74 is a system for analyzing image data of an image taken by the controller 7, thereby identifying an area having a high brightness in the image and detecting a position of a center of gravity, a size and the like of the area. The imaging information calculation section 74 has, for example, a maximum sampling period of about 200 frames/sec, and therefore can trace and analyze even a relatively fast motion of the controller 7. A configuration of the imaging information calculation section 74 will be described later in detail. On a rear surface of the housing 71, a connector 73 is provided. The connector 73 is, for example, an edge connector, and is used for engaging and connecting the controller 7 with a connection cable.

Figure 6:
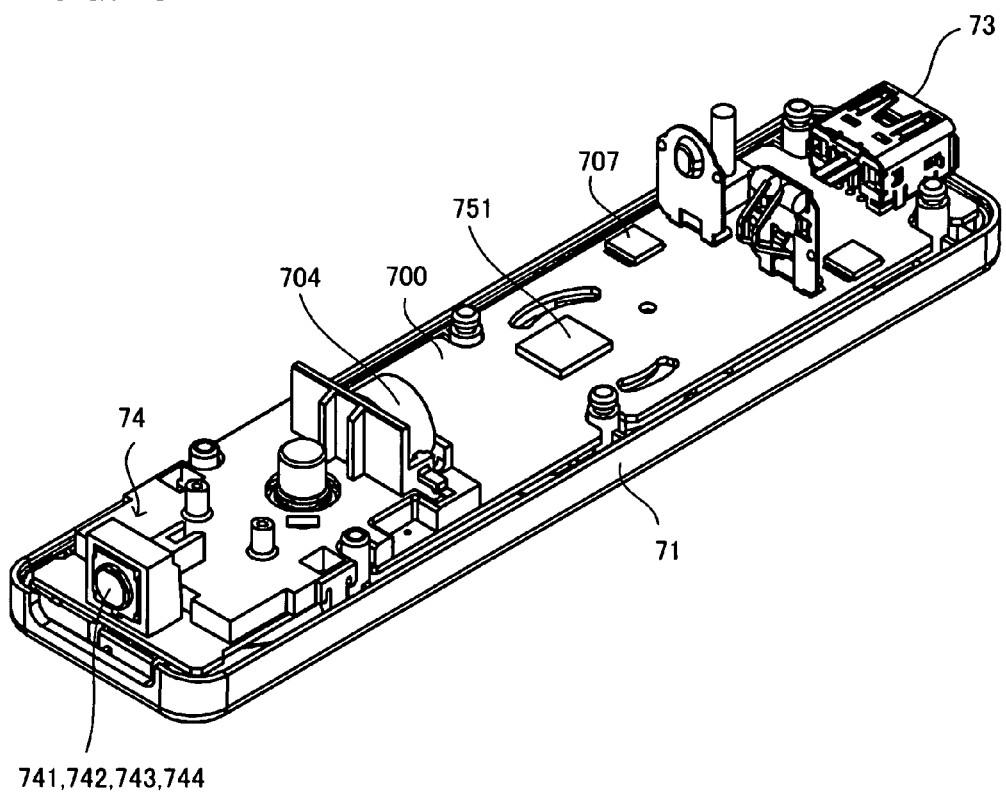
FIG. 6 is a perspective view illustrating a state where a lower housing of the controller 7 of FIG. 4 is removed.

The following will describe an internal structure of the controller 7 with reference to FIGS. 5 and 6. FIG. 5 is a perspective view illustrating a state where an upper housing (a part of the housing 71) of the controller 7 is removed as seen from a rear side thereof. FIG. 6 is a perspective view illustrating a state where a lower housing (a part of the housing 71) of the controller 7 is removed as seen from a front side thereof. FIG. 6 shows a reverse side of a substrate 700 shown in FIG. 5.

As shown in FIG. 5, the substrate 700 is fixed inside the housing 71. On a top main surface of the substrate 700, the operation buttons 72a to 72h, an acceleration sensor 701, the LEDs 702, and an antenna 754 and the like are provided. These components are connected to a microcomputer 751 (see FIGS. 6 and 7) by lines (not shown) formed on the substrate 700 and the like. The controller 7 functions as a wireless controller by a wireless module 753 (see FIG. 7) and the antenna 754. In the housing 71, a crystal oscillator (not shown) is provided for generating a basic clock of the microcomputer 751, which will be described later. On the top main surface of the substrate 700, the speaker 706 and an amplifier 708 are provided.

The acceleration sensor 701 is provided on the left side of the operation button 72d on the substrate 700 (or on the periphery of the substrate 700, not on the center thereof). The acceleration sensor 701 is capable of detecting acceleration included in a component caused by a centrifugal force in accordance with rotation of the controller 7 about the longitudinal direction, in addition to change of direction of gravitational acceleration. Thus, the game apparatus main body 5 or the like can be sensitive enough to determine the motion of the controller 7 from detected acceleration data using a predetermined calculation. For example, the controller 7 includes a three-axis acceleration sensor 701. The acceleration sensor 701 detects linear acceleration of the controller 7 for three axial directions of the controller 7, i.e., an up-down direction, a left-right direction, and a front-rear direction of the controller 7. Data indicative of each acceleration detected by the acceleration sensor 701 is outputted to the communication section 75.

As shown in FIG. 6, at a front edge of a bottom main surface of the substrate 700, the imaging information calculation section 74 is provided. The imaging information calculation section 74 includes an infrared filter 741, a lens 742, the image pickup element 743 and an image processing circuit 744 which are located in this order from the front surface of the controller 7. These components are attached to the bottom main surface of the substrate 700. At a rear edge of the bottom main surface of the substrate 700, the connector 73 is attached. On the bottom main surface of the substrate 700, a sound IC 707 and the microcomputer 751 are provided. The sound IC 707 is connected to the microcomputer 751 and the amplifier 708 by lines formed on the substrate 700 and the like, and outputs a sound signal to the speaker 706 through the amplifier 708 in accordance with the sound data transmitted from the game apparatus main body 5.

On the bottom main surface of the substrate 700, a vibrator 704 is attached. The vibrator 704 is, for example, a vibration motor or a solenoid. The vibrator 704 is connected to the microcomputer 751 by a line formed on the substrate 700 and the like, and actuated and unactuated in accordance with vibration data transmitted from the game apparatus main body 5. The controller 7 is vibrated by an actuation of the vibrator 704, and the vibration is conveyed to the player holding the controller 7. Thus, a so-called vibration-feedback game is realized. Since the vibrator 704 is located in the front portion of the housing 71, the housing 71 is vibrated substantially, and hence the player holding the controller 7 easily feels the vibration.

Figure 7:
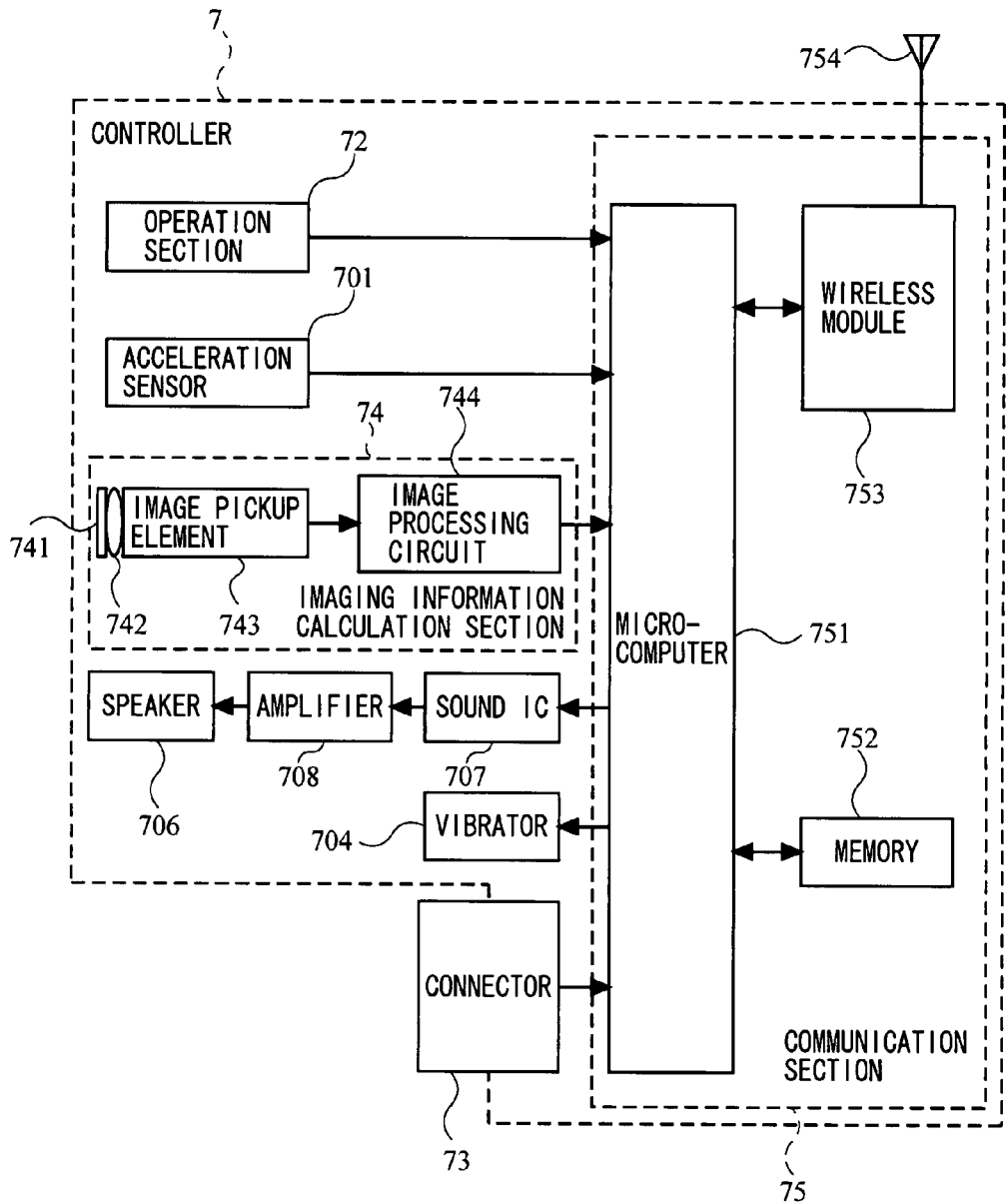
FIG. 7 is a block diagram showing an internal structure of the controller 7 of FIG. 3.

The following will describe an internal structure of the controller 7 with reference to FIG. 7. FIG. 7 is a block diagram showing the internal structure of the controller 7.

As shown in FIG. 7, the controller 7 includes therein the communication section 75 in addition to the operation section 72, the imaging information calculation section 74, the acceleration sensor 701, the vibrator 704, the speaker 706, the sound IC 707, and the amplifier 708.

The imaging information calculation section 74 includes the infrared filter 741, the lens 742, the image pickup element 743, and the image processing circuit 744. The infrared filter 741 allows, among lights incident on the front surface of the controller 7, only an infrared light to pass therethrough. The lens 742 converges the infrared light which has passed through the infrared filter 741, and outputs the infrared light to the image pickup element 743. The image pickup element 743 is a solid-state image pickup element such as a CMOS sensor or a CCD. The image pickup element 743 takes an image of the infrared light collected by the lens 742. In other words, the image pickup element 743 takes an image of only the infrared light which has passed through the infrared filter 741. Then, the image pickup element 743 generates image data of the image. The image data generated by the image pickup element 743 is processed by the image processing circuit 744. More specifically, the image processing circuit 744 processes the image data obtained from the image pickup element 743, detects an area of the image which has a high brightness, and outputs to the communication section 75 process result data indicating, e.g., a calculated coordinate position, square measure of the area. The imaging information calculation section 74 is fixed to the housing 71 of the controller 7. An imaging direction of the imaging information calculation section 74 can be changed by changing a facing direction of the housing 71.

The communication section 75 includes the microcomputer 751, a memory 752, the wireless module 753, and the antenna 754. The microcomputer 751 controls the wireless module 753 for wirelessly transmitting the transmission data while using the memory 752 as a storage area during processing. The microcomputer 751 controls the operations of the sound IC 707 and the vibrator 704 in accordance with the data which the wireless module 753 receives from the game apparatus main body 5 through the antenna 754. The sound IC 707 processes the sound data and the like transmitted from the game apparatus main body 5 through the communication section 75. The microcomputer 751 actuates the vibrator 704 in accordance with the vibration data (e.g. signals for actuating and unactuating the vibrator 704) transmitted from the game apparatus main body 5 through the communication section 75.

Data from the controller 7 such as an operation signal (key data) from the operation section 72, three-axis acceleration signals (acceleration data) from the acceleration sensor 701, and the process result data from the imaging information calculation section 74 are outputted to the microcomputer 751. The microcomputer 751 temporarily stores inputted data (the key data, the acceleration data and the process result data) in the memory 752 as the transmission data which is to be transmitted to the wireless controller module 19. Radio transmission from the communication section 75 to the wireless controller module 19 is performed at predetermined time intervals. Since game processing is generally performed at a cycle of 1/60 sec, the radio transmission needs to be performed at a cycle of a shorter time period. Specifically, game processing is performed at a cycle of 16.7 ms (1/60 sec), and a transmission interval of the communication section 75 structured using the Bluetooth (registered trademark) technology is 5 ms. At a timing of performing a radio transmission to the communication unit 6, the microcomputer 751 outputs to the wireless module 753 the transmission data stored in the memory 752 as a series of pieces of operation information. The wireless module 753 uses, for example, the Bluetooth (registered trademark) technology to radiate a radio signal indicative of the series of pieces of operation information with a carrier wave of a predetermined frequency from the antenna 754. Thus, the key data from the operation section 72, the acceleration data from the acceleration sensor 701, and the process result data from the imaging information calculation section 74 are transmitted from the controller 7. The wireless controller module 19 of the game apparatus main body 5 receives the radio signal, and the game apparatus main body 5 demodulates or decodes the radio signal to obtain the series of pieces of operation information (the key data, the acceleration data and the process result data). In accordance with the series of pieces of obtained operation information and the game program, the CPU 10 of the game apparatus main body 5 performs the game processing. In the case where the communication section 75 is structured using the Bluetooth (registered trademark) technology, the communication section 75 can have a function of receiving transmission data which is wirelessly transmitted from the other devices.

Figure 8:
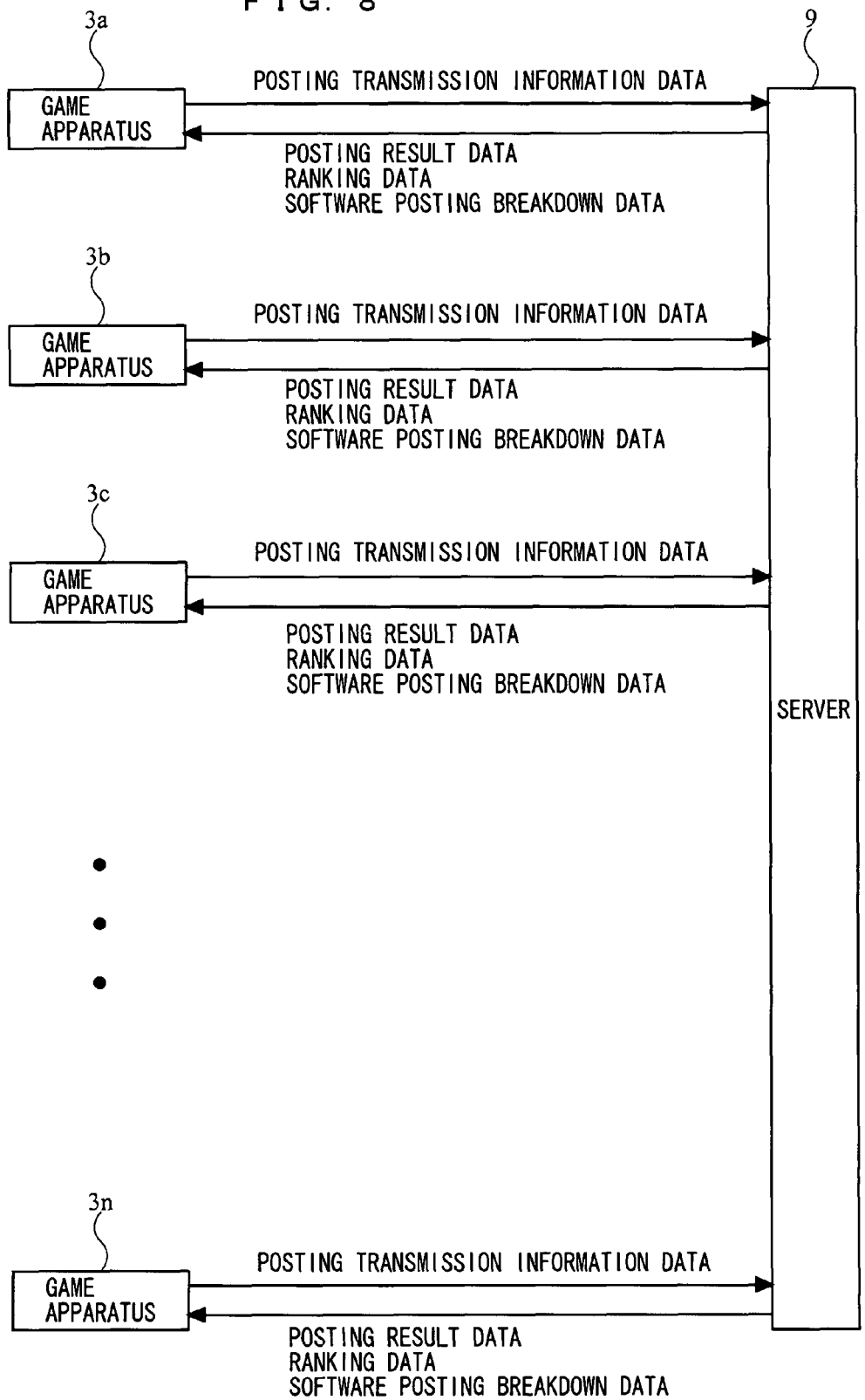
FIG. 8 is a block diagram showing an example of an information processing system which includes a plurality of game apparatuses 3 and a server 9.

With reference to FIG. 8, the following will describe an information processing system including a plurality of game apparatuses 3 and a server 9 prior to detailed description of processing executed by the game apparatus main body 5. FIG. 8 is a block diagram showing an example of the information processing system which includes the plurality of game apparatuses 3 and the server 9.

As shown in FIG. 8, the plurality of game apparatus 3a to 3n are communicably connected to the server 9 through a network or the like. For example, each of the game apparatus 3a to 3n transmits or receives data to or from the server 9 using the above-described constant connection usage type communication. The server 9 includes a storage unit, a memory, a CPU, and a communication section. These components are connected to each other through a bus. The storage unit of the server 9 stores a program for accumulating posting result which will be described later, a program for determining whether or not posting is possible, a communication connection control program for performing communication connection with each game apparatus 3, and various data which is generated by each program. The CPU of the server 9 is a processing unit or a control unit for executing various programs read in the memory. The communication section of the server 9 performs communication with the other game apparatuses 3a to 3n through the network.

For example, posting transmission information data is transmitted from each of the game apparatuses 3a to 3n to the server 9 in accordance with a posting operation of the player. On the other hand, posting result data, ranking data, software posting breakdown data, and the like are transmitted from the server 9 to each of the game apparatuses 3a to 3n according to need from the game apparatuses 3a to 3n.

The following will describe in detail information processing executed by the game system 1. First, main data used in the information processing will be described with reference to FIGS. 9 to 12. FIG. 9 shows an example of main data stored in the external main memory 12 and/or the internal main memory 35 of the game apparatus main body 5 (hereinafter, the two main memories are generically referred to as a main memory) and a flash memory 17 of the game apparatus main body 5. FIG. 10 shows an example of a play history file Fph stored in play history file data Dc. FIG. 11 shows an example of a posting list Lpos stored in posting list data Dd. FIG. 12 shows an example of posting transmission information Itp stored in posting transmission information data De.

As shown in FIG. 9, the main memory and the flash memory 17 store the operation information data Da, ranking data Db, the play history file data Dc, the posting list data Dd, the posting transmission information data De, software posting breakdown data Df, and image data Dg. In addition, the main memory and the flash memory 17 store various data required for various processings, such as data for executing the game processing, data for executing other processings, and the like but the detailed description thereof will be omitted.

The operation information data Da stores data indicative of the series of pieces of operation information (the key data, the acceleration data and the process result data) transmitted from the controller 7. The wireless controller module 19 of the game apparatus main body 5 receives the operation information transmitted from the controller 7 at a predetermined time interval (e.g. every 1/200 sec), and the operation information is stored in a buffer (not shown) provided in the wireless controller module 19. Then, the latest operation information stored in the above buffer is read out every one frame (e.g. every 1/60 sec) as a game processing period, and the operation information data Da of the main memory is updated.

The ranking data Db is data downloaded from the server 9, and stores data indicative of a ranking which is obtained by accumulating posting from each game apparatus 3. For example, the ranking shows a game software code, a type of medium, degree of recommendation, and a number of votes obtained for each game software as a review target. Specifically, the degree of recommendation and the number of votes obtained for the review target is shown for each sex and each age group.

The play history file data Dc stores data indicative of the play history file Fph for administrating a play history of a game software played using the game apparatus 3. As shown in FIG. 10, every time the player starts up the game software with the game apparatus main body 5 or every time a predetermined time elapses, a "game software title", a "game software code", a "play start date and time", a "play time", and the like are described in the play history file Fph and stored in the flash memory 17. In an example of the play history file Fph shown in FIG. 10, "game software A" as the "game software title", "AAAAAA" as the game software code", 7:00, Jan. 1, 2007" as the "play start date and time", and "25 minutes" as the "play time" are described.

The posting list data Dd stores data indicative of the posting list Lpos indicating whether or not posting is performed for each game software played with the game apparatus 3. As shown in FIG. 11, when the player performs predetermined operation, a "game software title", a "game software code", a "total play time", a "posted flag", and the like are described in the posting list Lpos for each game software and stored in the flash memory 17. For example, a posting history which can contain a predetermined number of items (e.g. 1000 items) arranged in the order of play with the game apparatus 3 is described in the posting list Lpos. The "total play time" shows a total time for which the game software has been played with the game apparatus main body 5. The "posted flag" shows a state of posted flag which turns to "ON" when posting for the game software has been performed with the game apparatus 3 and turns to "OFF" (not posted) when posting for the game software has not been performed. In an example of the posting list Lpos shown in FIG. 11, the total play time for the game software A (its code: AAAAAA) is 45 minutes, and the state of the posted flag is "OFF" (not posted). The total play time for the game software D (its code: DDDDDD) is 5 hours and 30 minutes, and the state of the posted flag is "ON" (posted).

The posting transmission information data De stores data indicative of the posting transmission information Itp which is transmitted from the game apparatus 3 to the server 9 in posting. As shown in FIG. 12, the posting transmission information Itp describes a "game apparatus serial number", a "game software code", a "total play time", "posted contents Q1 . . . ", and the like. The "game apparatus serial number" is a unique number for the game apparatus main body 5, and is set in advance for each game apparatus main body 5. The "posted contents Q1 . . . " shows contents which are selected by each poster concerning a plurality of questions on a game software for which the poster performs posting. In an example of the posting transmission information Itp shown in FIG. 12, the "game apparatus serial number" is "123456", the "game software code" is "QQQQQQ", the "total play time" is "2 hours and 10 minutes", the posted content Q1" is "1", the "posted content Q2" is "35", the "posted content Q3" is "65", and the "posted content Q4" and the "posted content Q5" are "2".

The software posting breakdown data Df stores data downloaded from the server 9 and indicative of detailed posting concerning a game software selected by the player. For example, in the posting breakdown, a result in which posted contents, degree of recommendation, a total play time and the like of each poster concerning the selected game software are accumulated is shown for each sex, each age group, and the like.

The image data Dg is image data for displaying later-described various menus and icons, and data downloaded from the server 9 on a display unit (the monitor 2).

Figure 13:
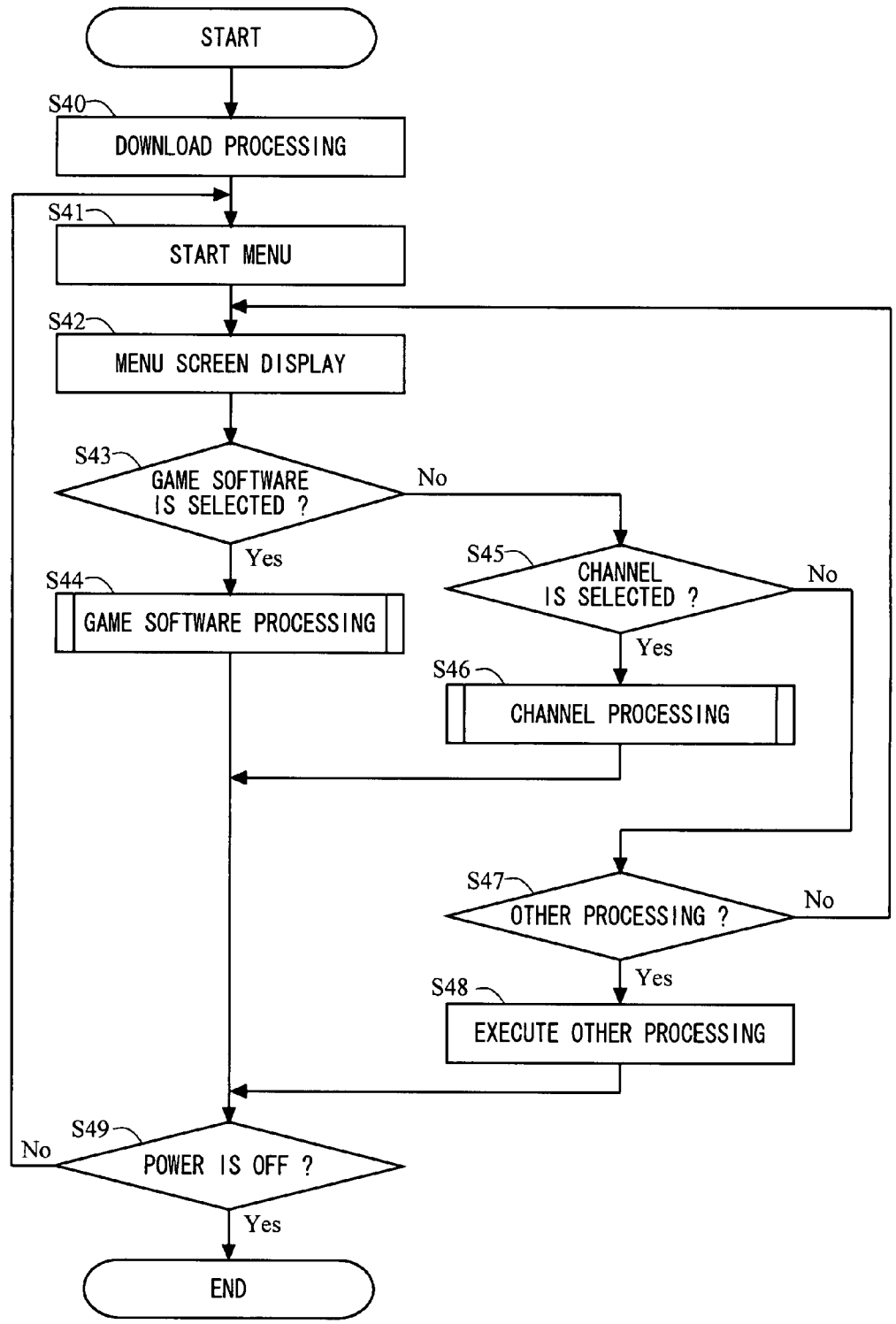
FIG. 13 is a flowchart showing a procedure of information processing executed by the game apparatus main body 5.
Figure 14:
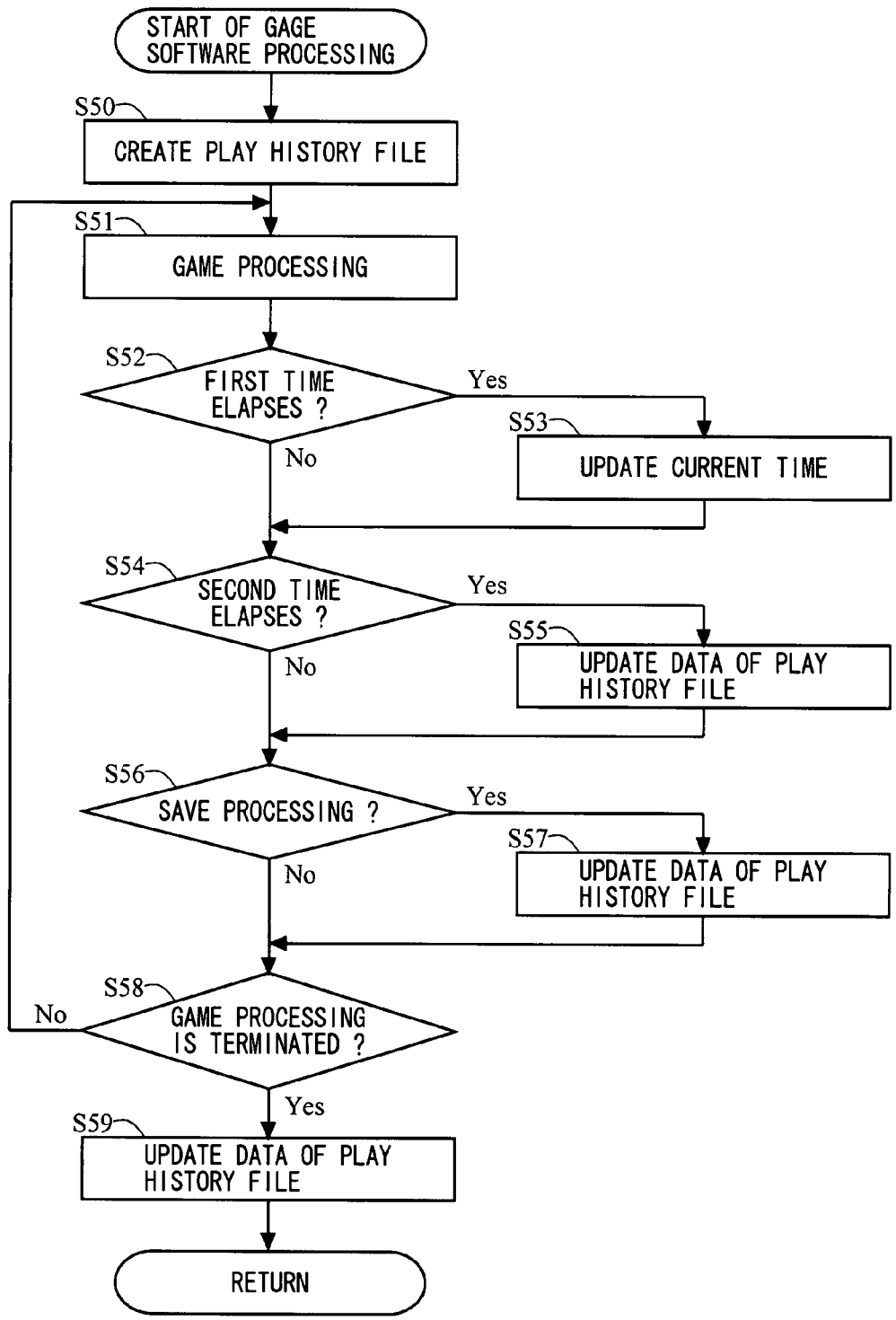
FIG. 14 is a flowchart of a subroutine showing a detailed operation of game software processing at step S44 in FIG. 13.
Figure 15:
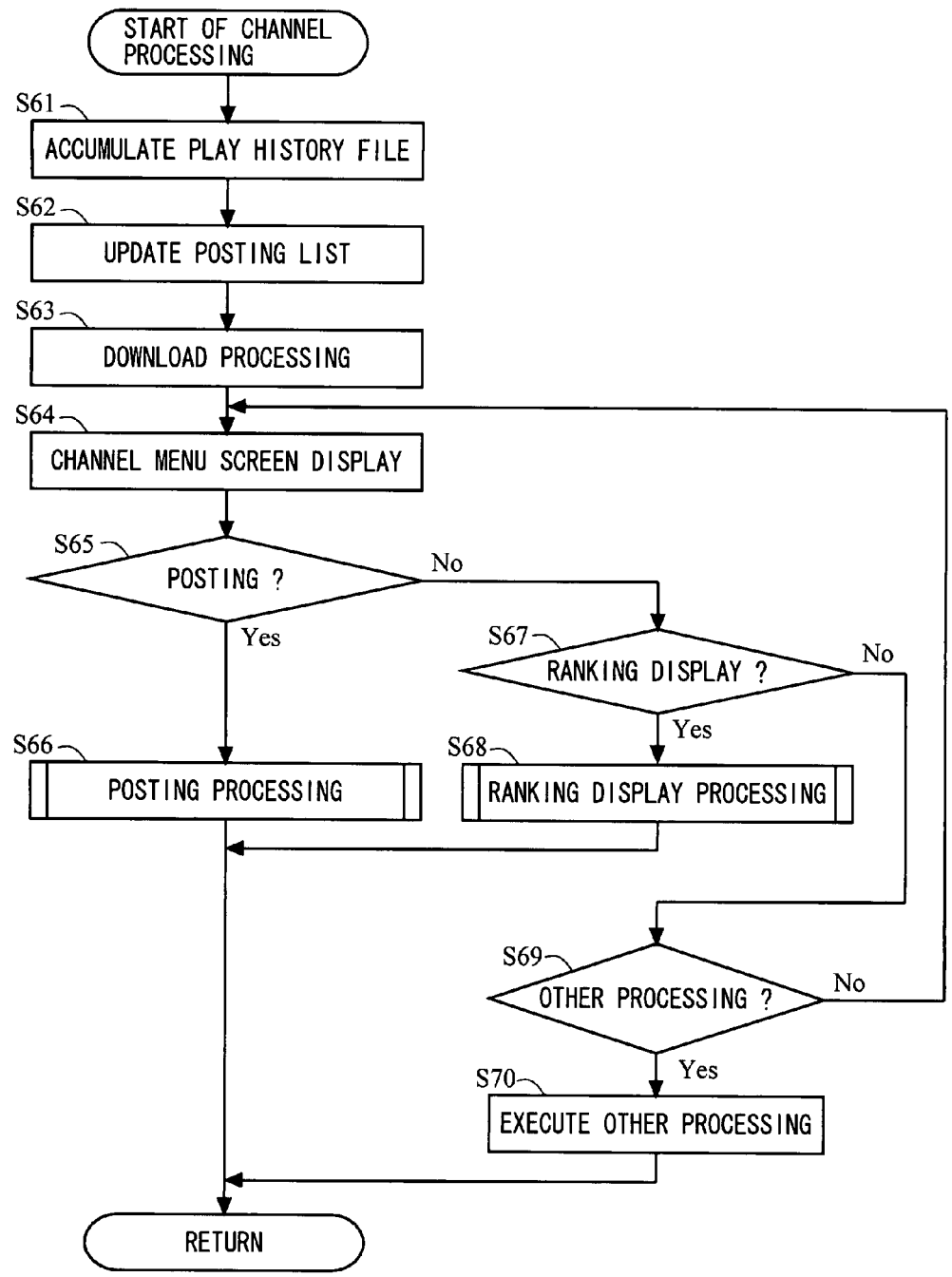
FIG. 15 is a flowchart of a subroutine showing a detailed operation of channel processing at step S46 in FIG. 13.
Figure 16:
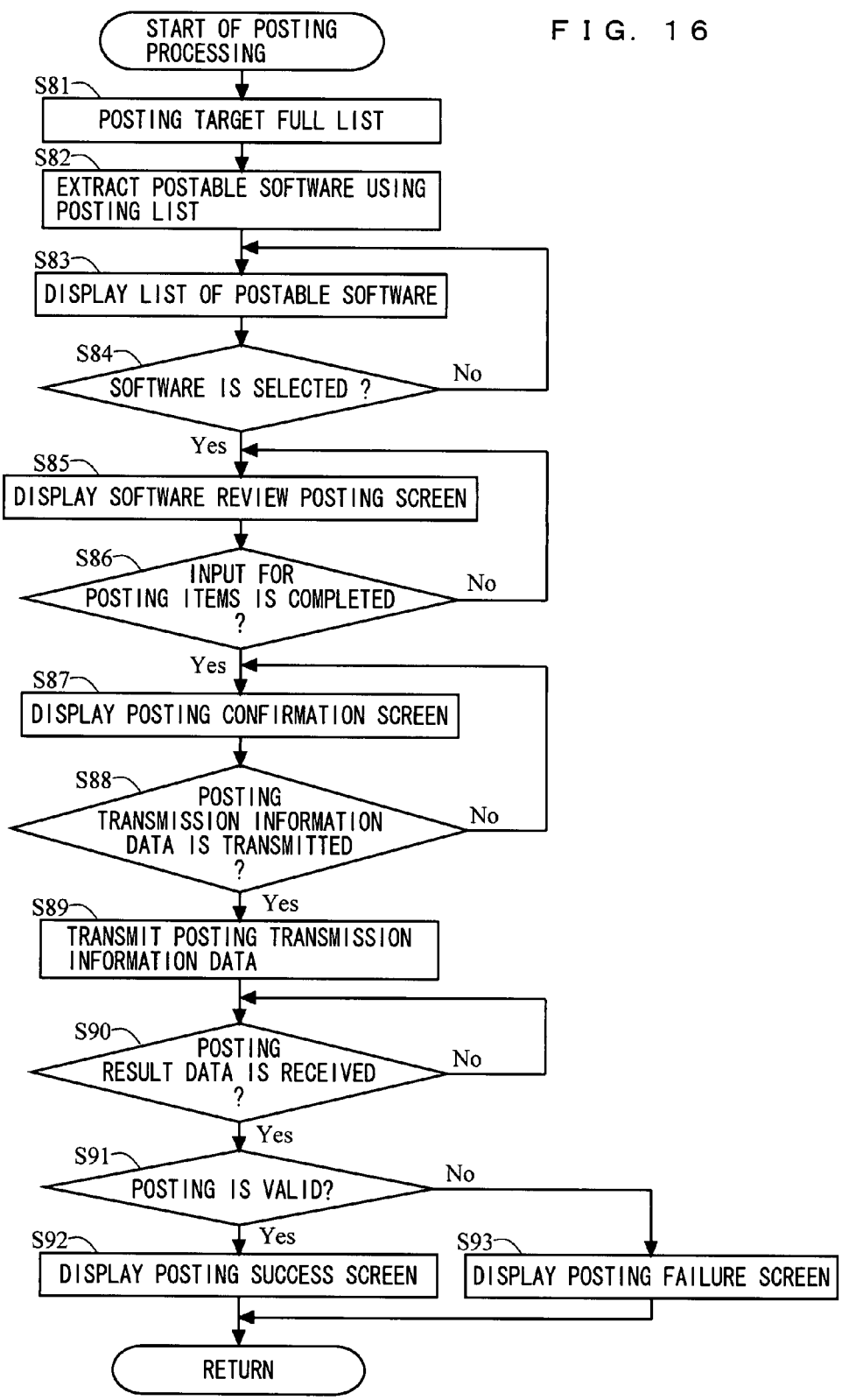
FIG. 16 is a flowchart of a subroutine showing a detailed operation of posting processing at step S66 in FIG. 15.
Figure 17:
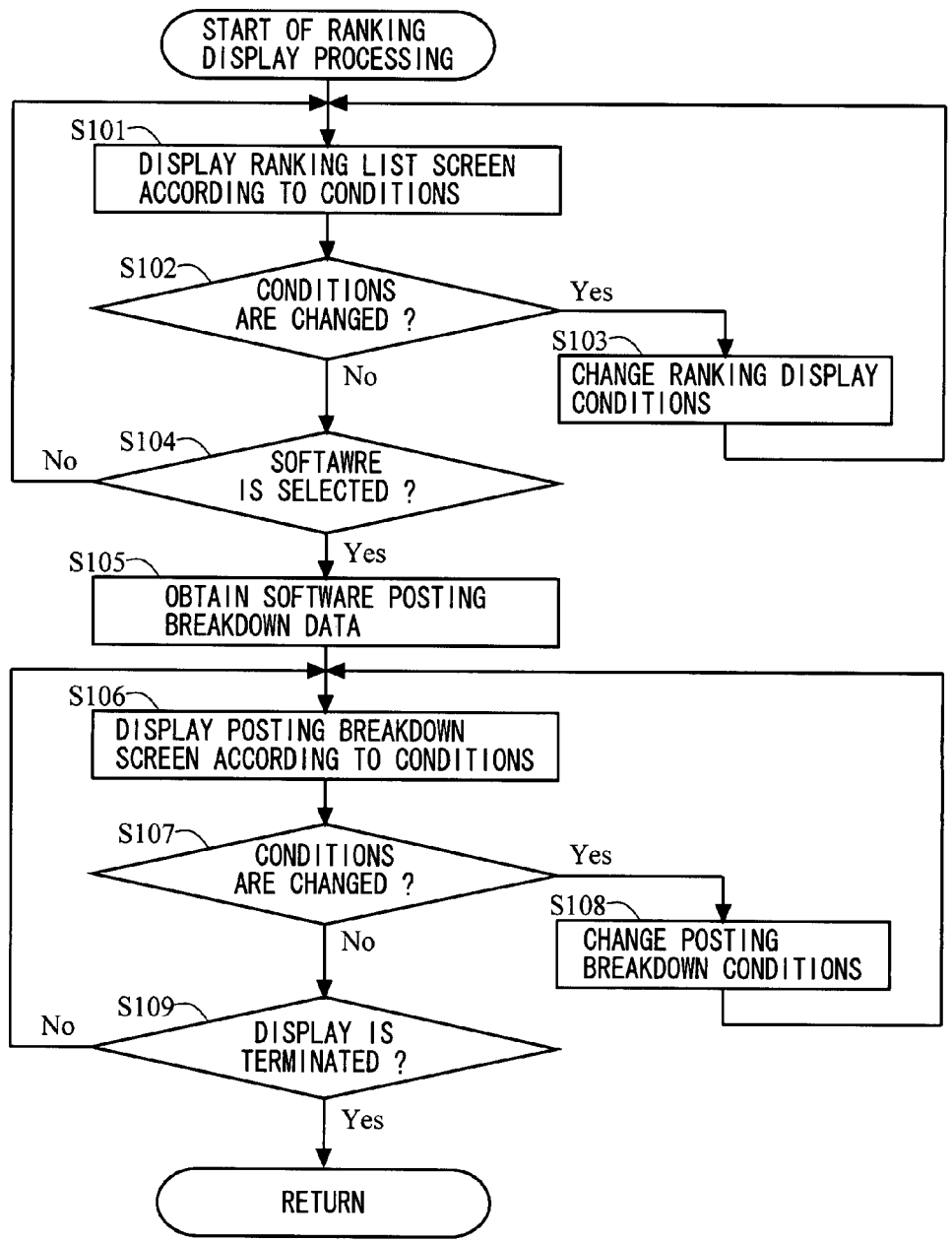
FIG. 17 is a flowchart of a subroutine showing a detailed operation of ranking display processing at step S68 in FIG. 15.
Figure 18:
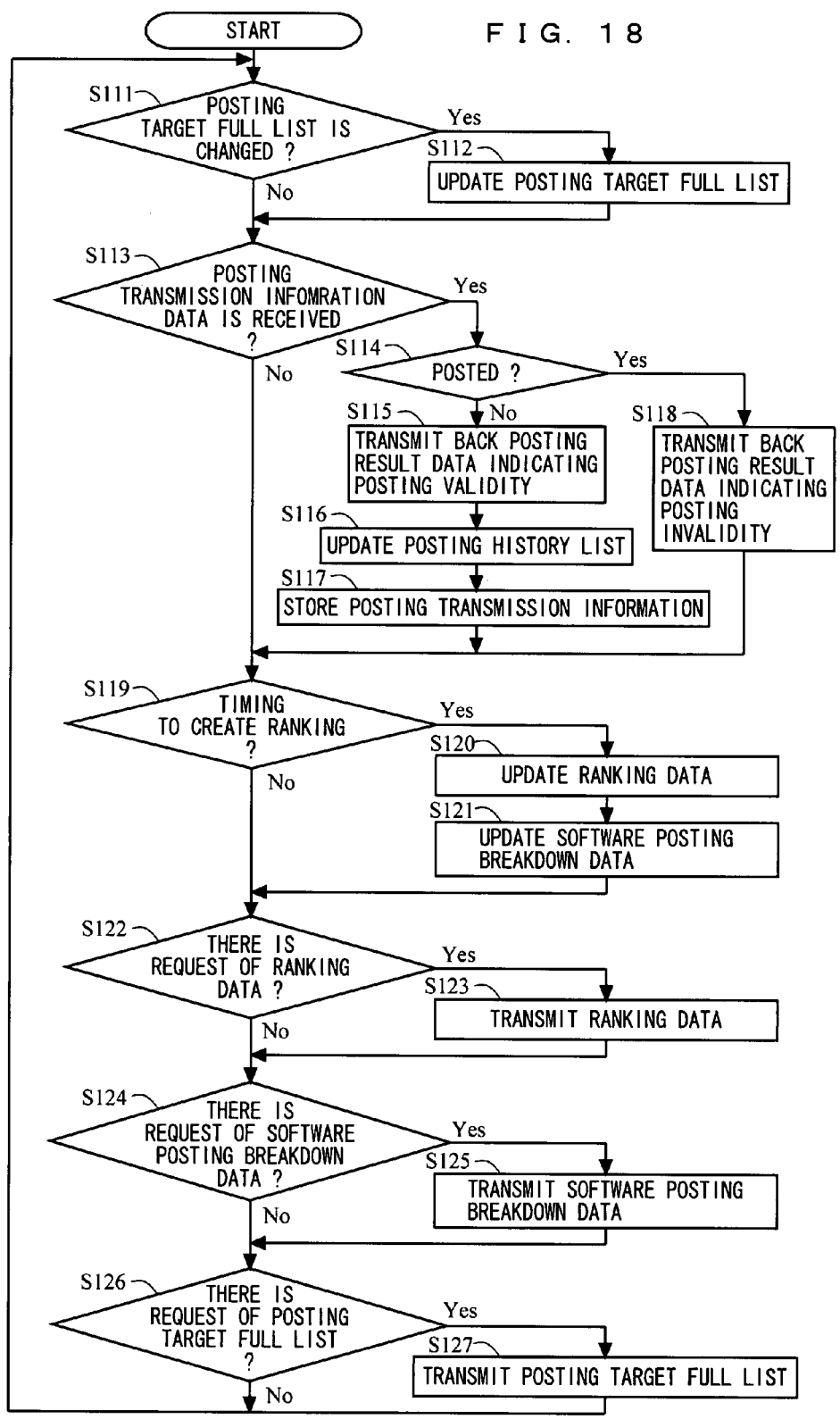
FIG. 18 is a flow chart showing a procedure of information processing executed by the server 9.

The following will described in detail the information processing executed by each of the game apparatus main body 5 and the server 9 with reference to FIGS. 13 to 18. FIG. 13 is a flow chart showing a procedure of the information processing executed by the game apparatus main body 5. FIG. 14 is a flow chart of a subroutine showing a detailed operation of game software processing at step 44 in FIG. 13. FIG. 15 is a flow chart of a subroutine showing a detailed operation of channel processing at step 46 in FIG. 13. FIG. 16 is a flow chart of a subroutine showing a detailed operation of posting processing at step 66 in FIG. 15. FIG. 17 is a flowchart of a subroutine showing a detailed operation of ranking display processing at step 68 in FIG. 15. FIG. 18 is a flow chart showing a procedure of the information processing executed by the server 9. It is noted that in the flow charts shown in FIGS. 13 to 18, among the information processing, processing of posting performed by the player and processing of viewing posting results of other players will be described, and the description concerning the other information processing which is not directly related to the present invention will be omitted. In FIGS. 13 to 18, each step executed by the CPU 10 or the server 9 is abbreviated to "S".

When the power button 24 of the game apparatus main body 5 is turned on, the game apparatus main body 5 is shifted from a state where the power is completely off or from the above low power standby mode to a normal processing mode. Then, the CPU 10 of the game apparatus main body 5 executes a startup program stored in the ROM/RTC 13, thereby initializing each unit such as the main memory and the like. When the optical disc 4 is mounted, the game program stored in the optical disc 4 is read by the main memory to provide a state in which the game program is executable by the CPU 10. The flow chart shown in FIG. 13 is a flow chart showing the information processing which is performed after the above processing is completed.

As shown in FIG. 13, the CPU 10 performs download processing (step 40), and advances the processing to the next step. For example, the CPU 10 downloads the ranking data stored in the server 9 for exhibition, and updates the ranking data Db. It is noted that when the latest ranking data has been stored in the ranking data Db, the download processing of the step 40 do not have to be performed. The step 40 is performed at the time of start-up of the game apparatus main body 5. In addition, the download processing may be performed during the low power standby mode periodically (e.g. every 6 hours). In this case, the ranking data is downloaded from the server 9 using the above-described constant connection usage type communication.

Next, the CPU 10 starts menu which is set in the game apparatus main body 5 (step 41), displays a screen showing the menu on the monitor 2, and advances the processing to the next step. For example, starting the menu and displaying the menu screen, the player can select a game software of the optical disc 4 in the menu screen for executing the game software, can select each channel in the menu screen to connect with the network for obtaining information and playing a network game, and can perform various settings for the game apparatus 3.

Next, the CPU 10 determines whether or not the player selects execution of the game software (step 43), whether or not the player selects a channel (step 45), and whether or not the player selects other processing (step 47). More specifically, the player can select a desired item from the menu screen by operating the controller 7. The CPU 10 can obtain operation state of the controller 7 by referring to the operation information data Da which is sequentially updated to the operation information transmitted from the controller 7. In other words, the CPU 10 can determine the item selected from the menu screen by the player using the operation state of the controller 7 (the operation information data Da). When the player selects the execution of the game software (YES at the step 43), the CPU 10 advances the processing to step 44. When the player selects the channel (YES at the step 45), the CPU 10 advances the processing to step 46. When the player selects the other processing (YES at the step 47), the CPU 10 executes the selected other processing, and advances the processing to the next step 49. On the other hand, when the execution of the game software, the channel, and the other processing are not selected (No at any of the step 43, the step 45 and the step 47), the CPU 10 returns to the step 42 to repeat the processing.

At the step 44, the CPU 10 performs the game software processing for executing the selected game software, and advances the processing to the next step 49. With reference to FIG. 14, the following will describe the game software processing executed at the step 44.

As shown in FIG. 14, the CPU 10 cerates the play history file Fph (step 50), and advances the processing to the next step. As described above, the play history file Fph is newly created when the player starts a game software with the game apparatus main body 5, and the game software title, the game software code, the play start date and time (0 minute at the time of start), and the like of the started game software are described therein and stored in the play history file data Dc (see FIG. 10).

Next, the CPU 10 executes predetermined game processing based on the game program currently executed and the operation information obtained from the controller 7 (step 51), and advances the processing to the next step. It is noted that the game processing at the step 51 is a unique operation for the currently executed game program in accordance with the operation of the controller 7 but the detailed description thereof will be omitted.

Next, the CPU 10 determines whether or not a first time (e.g. one minute) elapses from a current time of the last update based on a main body built-in clock (not shown) (step 52). When the first time elapses from the current time of the last update, the CPU 10 updates the current time indicated by current time data stored in the main memory or the like to a time clocked by the main body built-in clock (step 53), and advances the processing to the next step 54. On the other hand, when the first time has not elapsed from the current time of the last update, the CPU 10 advances the processing to the next step 54.

At the step 54, the CPU 10 determines, based on the main body built-in clock, whether or not a second time elapses after updating the play history file Fph. It is noted that the second time is longer than the first time, for example, 5 minutes. When the second time elapses from the time when the play history file Fph is updated, the CPU 10 updates the "play time" of the play history file Fph stored in the play history file data Dc based on the main body built-in clock (step 55), and advances the processing to the next step 56. On the other hand, when the second time has not elapsed from the time when the play history file Fph is updated, the CPU 10 advances the processing to the next step 56.

At the step 56, the CPU 10 determines whether or not save processing is executed for saving result data or midstream data of a game played by the player. Then, when the player performs the save processing, the CPU 10 updates the "play time" of the play history file Fph stored in the play history file data Dc based on the main body built-in clock (step 57), and advances the processing to the next step 58. On the other hand, when the player does not perform the saving processing, the CPU 10 advances the processing to the next step 58.

At the step 58, the CPU 10 determines whether or not the game processing is terminated. Conditions for terminating the game processing include, for example, satisfaction of conditions to make the game over, an operation performed by the player for terminating the game, and the like. The CPU 10 returns to the above step 51 to repeat the processing when the game processing is not terminated, and advances the processing to the next step 59 when the game is terminated.

At the step 59, the CPU 10 updates the "play time" of the play history file Fph stored in the play history file data Dc based on the main body built-in clock, and terminates this subroutine. As described above, a play time from the time of the start is described and updated in the play history file Fph each time a predetermined time (the second time) elapses from the time of starting the game program, at the time of executing the save processing of the game program, and at the time of terminating the game processing of the game program.

Referring back to FIG. 13, when the player selects the channel (YES at the step 45), the CPU 10 starts the selected channel and executes the channel processing (step 46), and then advances the processing to the next step 49. With reference to FIG. 15, the following will describe the channel processing executed at the step 46.

As shown in FIG. 15, the CPU 10 accumulates the play history file Fph stored in the play history file data Dc (step 61), updates the posting list Lpos (step 62), and advances the processing to the next step. At the step 61, the CPU 10 accumulates a play time of each game software in the play history file Fph which has not been accumulated yet. At the step 62, the total play time of the posting list Lpos stored in the posting list data Dd is updated by adding the play time accumulated at the step 61 for each game software thereto. Therefore, through the processing of the step 61 and the step 62, types of game softwares (game software titles and game software codes) for the predetermined number of items (e.g. 1000 items) in the order of play with the game apparatus 3, and the total play time for which these game softwares has been played until now are accumulated in the posting list Lpos and saved.

Next, the CPU 10 executes download processing (step 63), and advances the processing to the next step. It is noted that the download processing executed at the step 63 is similar to that at the above step 40, and hence the detailed description thereof will be omitted.

Figure 19:
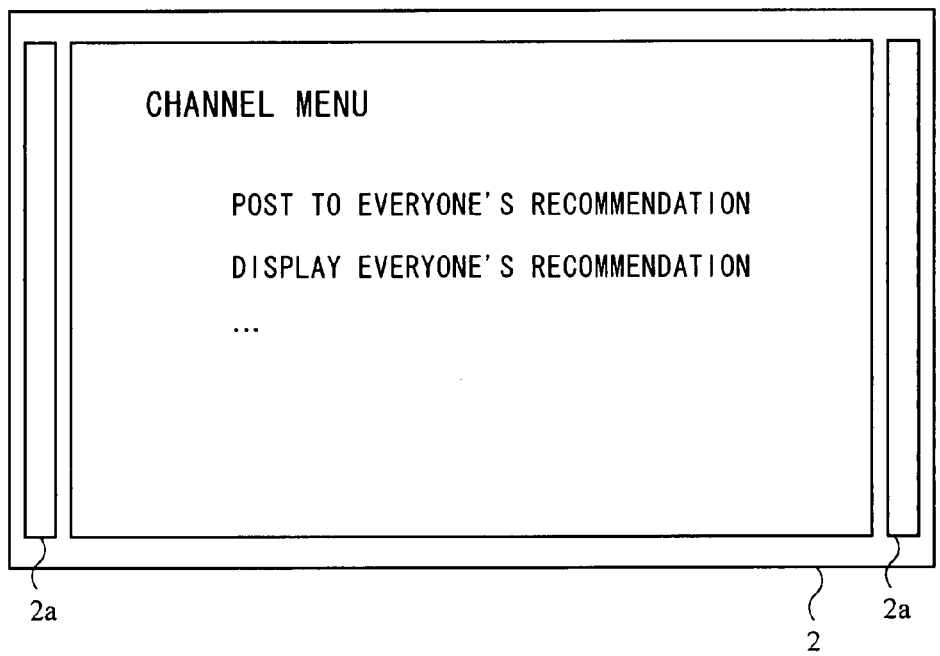
FIG. 19 is a view of an example of a channel menu screen displayed on a monitor 2.

Next, the CPU 10 displays a screen showing channel menu on the monitor 2 (step 64), and advances the processing to the next step. For example, as shown in FIG. 19, alternatives such as "post to everyone's recommendation", "display everyone's recommendation", and the like are displayed in the channel menu screen. Performing an operation with the controller 7 for making selection from these alternatives, the player can perform posting concerning a game software ("post to everyone's recommendation"), and can display a ranking of the posting result including postings of the other players ("display everyone's recommendation").

Next, the CPU 10 refers to the operation information data Da, and determines whether or not the player selects posting (step 65), whether or not the player selects ranking display (step 67), and whether or not the player selects other processing (step 69). When the player selects the posting (YES at the step 65), the CPU 10 advances the processing to the step 66. When the player selects the ranking display (YES at the step 67), the CPU 10 advances the processing to the step 68. When the player selects the other processing (YES at the step 69, the CPU 10 executes the selected other processing (step 70), and terminates the processing by this subroutine. On the other hand, when any of the posting, the ranking display, and the other processing are not selected (NO at any of the step 65, the step 67 and the step 69), the CPU 10 returns to the step 64 to repeat the processing.

At the step 66, the CPU 10 executes the posting processing, and terminates the processing by this subroutine. With reference to FIG. 16, the following will describe the posting processing executed at the step 66.

As shown in FIG. 16, the CPU 10 obtains a posting target full list from the server 9 (step 81), and advances the processing to the next step. Game softwares which are executable by the game apparatus 3 are set to be a posting target or a posting non-targeted object for each player by the server 9 in advance, and a list (the posting target full list) of the game softwares which are set to be a posting target is exhibited. At the step 81, the CPU 10 accesses the server 9 to obtain the exhibited posting target full list.

Next, the CPU 10 extracts game softwares which are postable by the player using the posting target full list obtained from the server 9 at the step 81 and the posting list Lpos stored in the posting list data Dd (step 82), and advances the processing to the next step.

At the step 82, game softwares which meet the following three conditions are extracted as a postable game software. The first condition is to be a game software which has been played by the player for a total play time which is equal to or longer than a predetermined time (e.g. one hour). The second condition is to be a game software which has not been posted until now. The third condition is to be a game software which is included in the posting target full list obtained at the step 81. As described above, in the posting list Lpos, a total play time for which a game software has been played until now is accumulated for each game software. As described later, the posted flag which is set to be ON according to the posting processing by the player is described in the posting list Lpos, it is distinguished whether or not each game software has been posted by referring to the posted flag. Thus, the CPU 10 distinguishes and extracts game softwares which meet the above three conditions by referring to the posting target full list obtained at the step 81 and the posting list Lpos.

Figure 20:
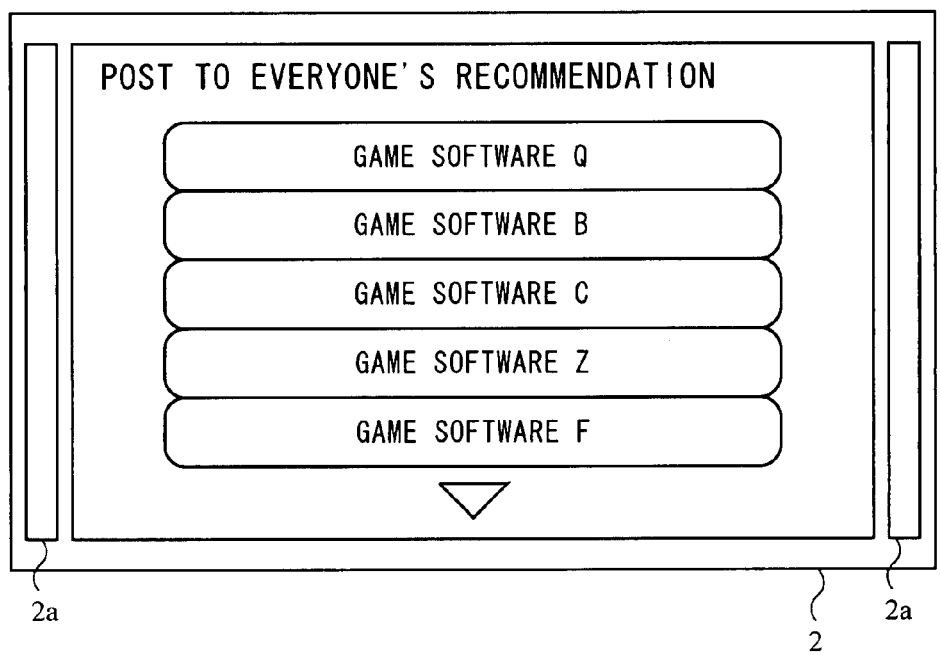
FIG. 20 is a view of an example of a postable game software list displayed on the monitor 2.

Next, the CPU 10 displays a list of the postable game softwares extracted at the step 82 on the monitor 2 (step 83). For example, as shown in FIG. 20, the postable game softwares are listed. In an example of the postable game softwares shown in FIG. 20, a game software Q, a game software B, a game software C, a game software Z, a game software F, and the like are listed on the monitor 2. The player can select a desired game software as a posting target from the list of the postable game softwares displayed on the monitor 2 by operating the controller 7. Then, when the player selects any game software from the list of the postable game softwares (YES at step 84), the CPU 10 advances the processing to step 85.

At the step 85, the CPU 10 displays a review posting screen concerning the game software selected as the posting target on the monitor 2. For example, posting items for the game software include sex of poster, age of poster, "who the game software is suitable for" ("anyone" or "a person who is used to a game, "in which way the game software is suitable to be played" ("when wanting to play casually" or "when wanting to play steadily"), "by how many people the game software is suitable to be played" ("alone" or "by everyone"), and the like, in addition to degree of recommendation of the game software (e.g. a rating between 0-100). The player can select and/or input an intended content or a numeric value for each posting item displayed on the monitor 2 by operating the controller 7. When the player completes the input for all of the posting items (YES at step 86), the CPU 10 advances the processing to step 87.

Figure 21:
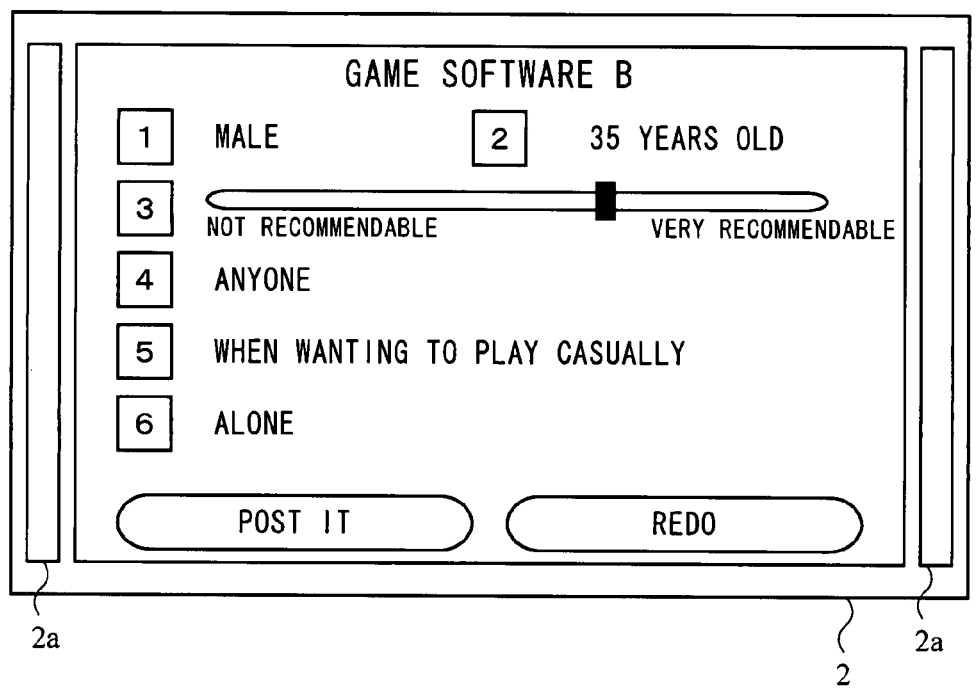
FIG. 21 is a view of an example of a posting confirmation screen displayed on the monitor 2.

At the step 87, the CPU 10 displays a posting confirmation screen showing the contents inputted by the player for all of the posting items on the monitor 2. As shown in FIG. 21, in addition to the content inputted by the player for each posting item, the posting confirmation screen shows alternatives which cause the player to select whether or not the input contents are posted. In an example of the posting confirmation screen shown in FIG. 21, as the inputted contents with respect to the "game software B", "male" as sex of poster, "35 years old" as age of poster, "graph display" as degree of recommendation of game software, "anyone" as "who the game software is suitable for", "when wanting to play casually" as "in which way the game software is suitable to be played", and "alone" as "by how many people the game software is suitable to be played" are shown. "Post it" and "redo" are also shown as the alternatives to be selected by the player. The player can select the alternative displayed on the monitor 2 by operating the controller 7. When the player selects posting, namely when posting transmission information data is transmitted (YES at step 88), the CPU 10 advances the processing to the next step 89.

At the step 89, the CPU 10 transmits the posting transmission information data to the server 9. More specifically, the CPU 10 transmits to the server 9 the posting transmission information data De storing the posting transmission information Itp which describes the posted contents inputted by the player. Then, the CPU 10 sets the posted flag of the game software of the transmitted posting transmission information Itp to be ON, and updates the posting list Lpos stored in the posting list data Dd. As described above with reference to FIG. 12, the posting transmission information Itp to be transmitted to the server 9 describes the "game apparatus serial number", the "game software code", and the "total play time" in addition to the posted contents described as the "posted contents Q1 . . . ", and all of the information is transmitted to the server 9. The CPU 10 waits to receive the posting result data transmitted back from the server 9 (step 90).

When receiving the posting result data from the server 9 (YES at the step 90), the CPU 10 determines whether or not the received posting result data shows success of the posting (step 91). As described later, the server 9 determines validity/invalidity of the posting when receiving the posting transmission information data from the game apparatus 3, and transmits back the determination result as the posting result data to the game apparatus 3 (see step 115 and step 118). When the received posting result data shows the validity of the posting, the CPU 10 advances the processing to the next step 92. On the other hand, when the received posting result data shows the invalidity of the posting, the CPU 10 advances the processing to the next step 93.

Figure 22:
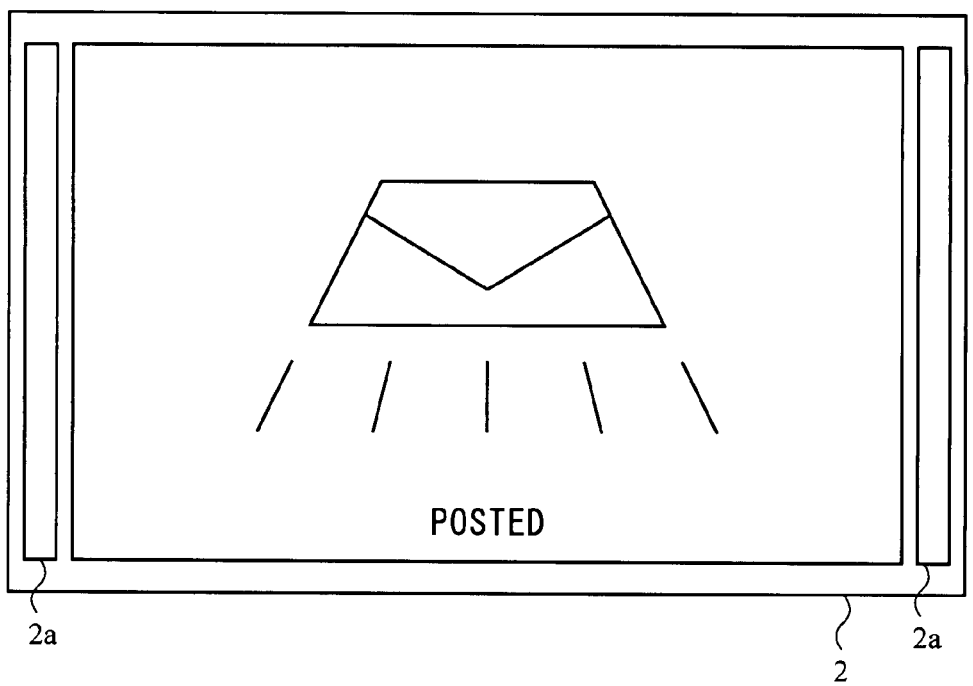
FIG. 22 is a view of an example of a posting success screen displayed on the monitor 2.

At the step 92, the CPU 10 displays a posting success screen showing the success of the posting on the monitor 2, and terminates the processing by this subroutine. For example, as shown in FIG. 22, a screen by which the player can know immediately the success of the posting is displayed as the posting success screen on the monitor 2.

Figure 23:
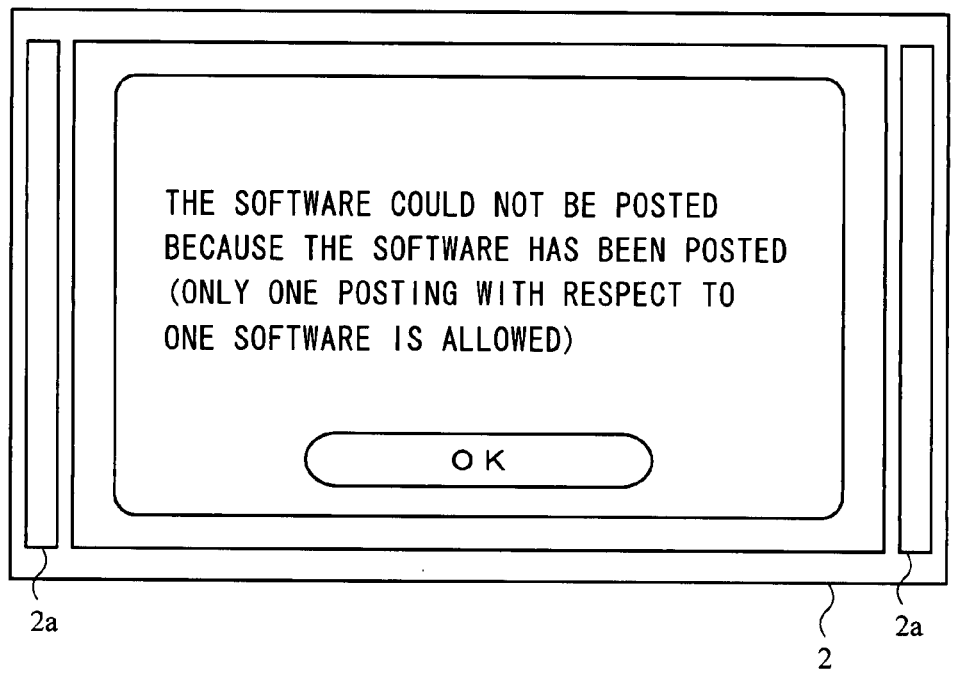
FIG. 23 is a view of an example of a posting failure screen displayed on the monitor 2.

At the step 93, the CPU 10 displays a posting failure screen showing the failure of the posting on the monitor 2, and terminates the processing by this subroutine. The server 9 sets a limit to a number of times of posting. For example, only one posting with respect to each game software is accepted. Thus, second posting with respect to the identical game software is performed, the server 9 transmits back posting result data showing the invalidity of the posting. In this case, as shown in FIG. 23, a message indicating that the posting has not been accepted because the game software has been posted is displayed as the posting failure screen on the monitor 2.

As described above, in the posting processing at the step 66, only the game softwares which have been played by the player for a total play time which is equal to or longer than the predetermined time become postable. This achieves ease and reliability of reviewing (posting). In the posting processing at the step 66, the limit is set to the number of times of posting (e.g. one posting with respect to each posting target), and the number of times of posting is checked by the game apparatus 3 and the server 9. Even if data of a number of times of posting in the game apparatus 3 is manipulated, posting become invalid by checking and limiting the number of times of posting by the server 9. Thus, intentional mass posting is prevented, thereby improving reliability of reviewing (posting). In the game apparatus 3, the game softwares which have been posted are excluded from the list of the postable game softwares, and hence the limitation to the number of times of posting is notified to the player in advance, thereby preventing the player from uselessly performing posting operations.

Referring back to FIG. 15, when the player selects the ranking display (YES at the step 67), the CPU 10 executes the ranking display processing (the step 68), and terminates the processing by this subroutine. With reference to FIG. 17, the following will describe the ranking display processing executed at the step 68.

Figure 24:
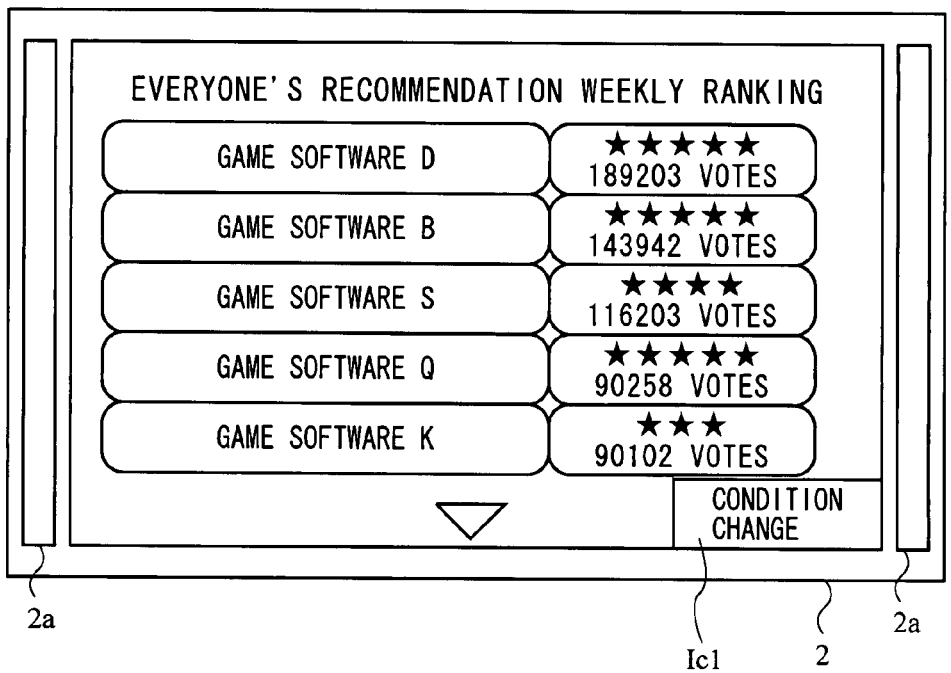
FIG. 24 is a view of an example of a ranking list screen displayed on the monitor 2.

As shown in FIG. 17, the CPU 10 displays a ranking list screen according to conditions on the monitor 2 using the ranking data Db downloaded from the server 9 (step 101), and advances the processing to the next step. For example, as shown in FIG. 24, game softwares are listed in the ranking list screen in descending order of a number of postings from each game apparatus 3. The conditions for creating the ranking list include a period of accumulating a number of postings (weekly, monthly, annually, and the like), sex (both genders, male, female), age group (all age group, 12 years old or younger, 13 to 18 years old, 19 to 24 years old, 25 to 34 years old, 35 to 44 years old, 45 to 54 years old, 55 years old or older, and the like), target software (all software, optical disc software, channel software, and the like), and the like. These conditions are changeable by an operation performed by the player with the controller 7. In an example of the ranking list screen shown in FIG. 24, a weekly ranking is shown, and a number of votes obtained by each game software and an average of degree of recommendation for each game software which is indicated by a number of stars are displayed.

Next, the CPU 10 determines whether or not the player changes the conditions for displaying the ranking list screen (step 102). For example, the CPU 10 refers to the operation information data Da and determines that the player changes the conditions when an operation is performed for selecting a condition change icon Ic1 shown in FIG. 24. When the conditions are changed, the CPU 10 changes the conditions for displaying the ranking list screen in accordance with the operation by the player (step 103), and returns to the step 101 to continue the processing. On the other hand, when the conditions are not changed, the CPU 10 advances the processing to the next step 104.

At the step 104, the CPU 10 determines whether or not the player selects a game software from the ranking list screen. For example, the CPU 10 refers to the operation information data Da and determines that the game software is selected when an operation is performed for selecting any game software from the ranking list screen shown in FIG. 24. When a game software is selected, the CPU 10 advances the processing to the next step 105. On the other hand, when any game software is not selected, the CPU 10 returns to the step 101 to continue the processing.

At the step 105, the CPU 10 requests download of the software posting breakdown data to the server 9, and downloads the data. The server 9 exhibits the software posting breakdown data showing the detail of the posting breakdown for each game software, and transmits the software posting breakdown data according to need from the game apparatus 3. At the step 105, the CPU 10 stores the transmitted software posting breakdown data in the flash memory 17, and advances the processing to the next step.

Figure 25:
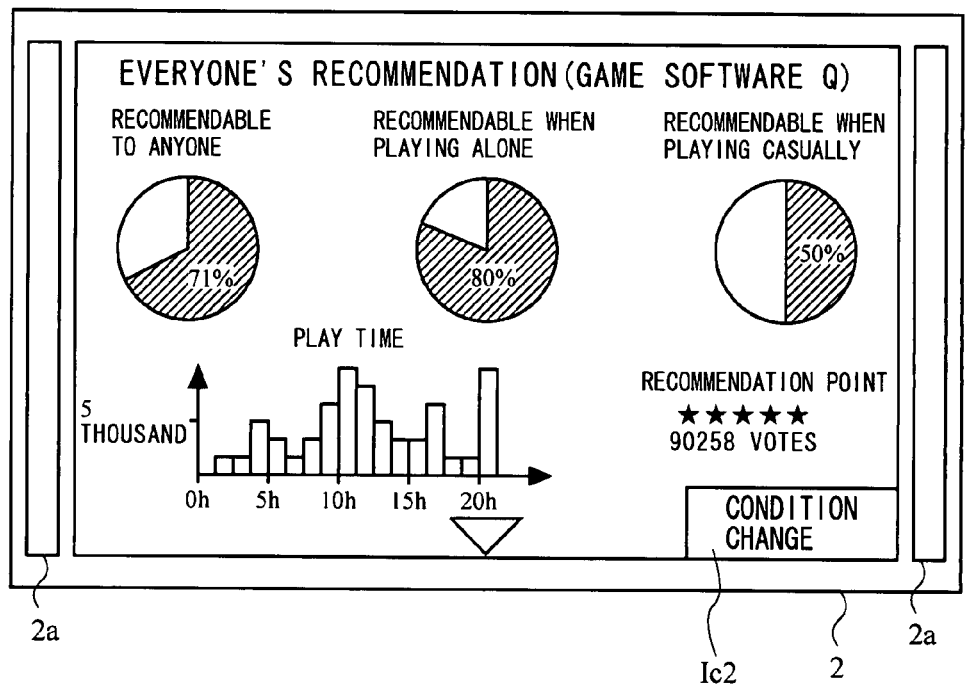
FIG. 25 is a view of an example of a posting breakdown screen displayed on the monitor 2.

Next, the CPU 10 displays a posting breakdown screen according to conditions on the monitor 2 using the software posting breakdown data obtained at the step 105 (step 106). For example, as shown in FIG. 25, an accumulation result of the posted contents from each game apparatus 3 for the game software (here, the game software Q) selected by the player at the step 104 is shown. The conditions for displaying the posting breakdown include sex (both genders, male, female), age group (all age group, 12 years old or younger, 13 to 18 years old, 19 to 24 years old, 25 to 34 years old, 35 to 44 years old, 45 to 54 years old, 55 years old or older, and the like), and the like. These conditions are also changeable by an operation performed by the player with the controller 7. In an example of the posting breakdown screen shown in FIG. 25, as the posted contents for the game software Q, a rate that "recommendable to anyone" is posted is 71%, a rate that "recommendable when playing alone" is posted is 80%, a rate that "recommendable when playing casually" is posted is 50%, and an average of degree of recommendation is a rank of 5 (five stars). In the posting breakdown screen, a breakdown of the play times at each time of posting by posters is graphed out. Thus, viewing the graph of the play time, the player can determine after how long the game software has been played the posted contents are made, and hence can know reliability of the posted contents.

It is noted that the break down of the play times of posters displayed in the posting breakdown screen may be displayed in other forms. For example, an average (an average play time) of the total play times at each time of posting by posters may be displayed in the posting breakdown screen. Even though such an average play time is displayed, the player can determine after how long the game software has been played the posted contents are made by viewing the average play time, and hence can know reliability of the posted contents.

Next, the CPU 10 determines whether or not the player changes the conditions for displaying the posting breakdown screen (step 107). For example, the CPU 10 refers to the operation information data Da and determines that the player changes the conditions when an operation is performed for selecting a condition change icon Ic2 shown in FIG. 25. When the conditions are changed, the CPU 10 changes the conditions for displaying the posting breakdown screen in accordance with the operation by the player (step 108), and returns to the step 106 to continue the processing. On the other hand, when the conditions are not changed, the CPU 10 advances the processing to the next step 109.

At the step 109, the CPU 10 determines whether or not the display of the posting breakdown screen is terminated. Conditions for terminating the display include, for example, an operation performed by the player for terminating the display, and the like. The CPU 10 returns to the step 106 to repeat the processing when the display is not terminated, and terminates the processing by this subroutine when the display is terminated.

Referring back to FIG. 13, after the game software processing at the step 44, the channel processing at the step 46, and the other processing at the step 48 are executed, the CPU 10 determines whether or not the power button 24 of the game apparatus main body 5 is turned off (THE step 49). When the power button 24 is at ON state, the CPU 10 returns to the step 41 to repeat the processing. On the other hand, when the power button 24 is turned off, the CPU 10 shifts the game apparatus main body 5 from the normal processing mode to the low power standby mode, or from the normal processing mode to the state where the power is completely off, and terminates the flow chart.

With reference to FIG. 18, the following will describe the processing of the server 9.

As shown in FIG. 18, the CPU of the server 9 determines whether or not the posting target full list is changed (step 111). As described above, the posting target full list is a list in which the game softwares postable by each game apparatus 3 are set to be or not to be a posting target in advance, and which is stored in the storage unit of the server 9 and exhibited to each game apparatus 3. The posting target full list is changeable by an operator of the server 9. For example, at the step 111, the CPU of the server 9 determines that the posting target full list is changed when the operator performs an operation to the server 9 for changing the posting target full list. When the posting target full list is changed, the CPU of the server 9 advances the processing to the next step 112. On the other hand, when the posting target full list is not changed, the CPU of the server 9 advances the processing to the next step 113.

At the step 112, the CPU of the server 9 updates the posting target full list in accordance with an input of the operator of the server 9, and stores the updated posting target full list in the storage unit of the server 9. For example, in the case where a new software which is executable by each game apparatus 3 is developed, or in the case of changing posting target classification of the game softwares which have been registered in the list (changing from a posting target to a posting non-targeted object or changing from a posting non-targeted object to a posting target), the operator of the server 9 performs an operation for changing the posting target full list. When the update of the posting target full list by the operator is terminated, the CPU of the server 9 advances the processing to the next step 113.

At the step 113, the CPU of the server 9 determines whether or not the server 9 has received the posting transmission information data transmitted from the game apparatus 3 (see the step 88). When the server 9 has received the posting transmission information data, the CPU of the server 9 advances the processing to the next step 114. On the other hand, when the server 9 has not received the posting transmission information data, the CPU of the server 9 advances the processing to the next step 119.

At the step 114, the CPU of the server 9 determines whether or not the received posting transmission information data has been posted using a transmission source and a game software as a posting target which are indicated by the received posting transmission information data. In the storage unit of the server 9, a history of the received posting transmission information data is stored as a posting history list. The posting history list describes a combination of the game apparatus 3 by which posting is performed (the game apparatus serial number) and the game software as the posting target for each posting. In other words, if it is confirmed that a combination of these information items has been described in the posting history list by referring to the "game apparatus serial number" and the "game software code" of the posting transmission information Itp indicated by the posting transmission information data, it is determined that the received posting transmission information Itp has been posted. When the received posting transmission information Itp has been posted, the CPU of the server 9 advances the processing to the next step 118. On the other hand, when the received posting transmission information Itp has not been posted, the CPU of the server 9 advances the processing to the next step 115.

At the step 115, the CPU of the server 9 transmits back the posting result data indicating the acceptance of the posting (posting validity) to the game apparatus 3 as the transmission source of the posting transmission information data. Then, the CPU of the server 9 updates the posting history list stored in the storage unit by adding the "game apparatus serial number" and the "game software code" indicated by the posting transmission information Itp thereto (step 116). The CPU of the server 9 stores the received posting transmission information Itp in the storage unit (step 117), and advances the processing to the next step 119.

At the step 118, the CPU of the server 9 transmits back the posting result data indicating the nonacceptance of the posting (posting invalidity) to the game apparatus 3 as the transmission source of the posting transmission information data, and advances the processing to the next step 119. As described above, the server 9 sets the limit to the number of times of posting such that only one posting with respect to the identical game software from the identical game apparatus 3 is allowed.

At the step 119, the CPU of the server 9 determines whether or not it is a timing to create a ranking based on the posting result. In the embodiment, ranking data and software posting breakdown data are created by storing the posting transmission information Itp received from each game apparatus 3 for a certain period and executing batch processing thereon. Thus, at the step 119, the CPU of the server 9 determines whether or not a timing to execute the batch processing has come. When the timing to create the ranking has come, the CPU of the server 9 advances the processing to the next step 120. On the other hand, when it is not the timing to create the ranking, the CPU of the server 9 advances the processing to the next step 122.

When the timing to create the ranking has come, the CPU of the server 9 accumulates the stored posting transmission information Itp from the previous batch processing, updates the ranking data (step 120) and the software posting breakdown data step 121), and advances the processing the next step 122. As described above, the ranking data is data indicating a ranking in which posting from each game apparatus 3 is accumulated. For example, the ranking indicated by the ranking data includes the game software code, the type of medium, the accumulation result of degree of recommendation and a number of votes obtained, and the like for each game software. Especially, the degree of recommendation and the number of votes obtained for the review target are accumulated for each sex, and each age group, and the like, and described in the ranking. Also, as described above, the software posting breakdown data is data showing the detail of each posting breakdown for each game software. For example, the software posting breakdown data describes a result in which the posted contents, the degree of recommendation, the total play time, and the like concerning each game software are accumulated for each sex, each age group, and the like. The ranking data and the software posting breakdown data are stored in the storage unit of the server 9, and exhibited to each game apparatus 3. The ranking data and the software posting breakdown data are updateable by the above batch processing.

At the step 122, the CPU of the server 9 determines whether or not there is a request of the ranking data from the game apparatus 3 (see the step 40 and the step 63). When there is the request of the ranking data, the CPU of the server 9 transmits the ranking data stored in the storage unit to the game apparatus 3 as a request source (step 123), and advances the processing to the next step 124. On the other hand, when there is no request of the ranking data, the CPU of the server 9 advances the processing to the next step 124.

At the step 124, the CPU of the server 9 determines whether or not there is a request of the software posting breakdown data from the game apparatus 3 (see the step 105). When there is the request of the software posting breakdown data, the CPU of the server 9 transmits to the game apparatus 3 as a request source the software posting breakdown data stored in the storage unit and corresponding to the requested game software (step 125), and advances the processing to the next step 126. On the other hand, when there is no request of the software posting breakdown data, the CPU of the server 9 advances the processing to the next step 126.

At the step 126, the CPU of the server 9 determines whether or not there is a request of the posting target full list from the game apparatus 3 (see the step 81). When there is the request of the posting target full list, the CPU of the server 9 transmits data of the posting target full list stored in the storage unit to the game apparatus 3 as a request source (step 127), and returns to the step 111 to repeat the processing. On the other hand, when there is no request of the posting target full list, the CPU of the server 9 returns to the step 111 to repeat the processing.

As described above, according to the game apparatus 3 and the server 9 of the embodiment, reviewing a game software executable by each game apparatus 3 can be performed using the communication between each game apparatus 3 and the server 9. When the player of each game apparatus 3 posts a result of reviewing a game software, only the game software which has been played by the player for a total play time which is equal to or longer than the predetermined time is postable. This achieves ease and reliability of reviewing (posting). Also, when the player of each game apparatus 3 posts a result of reviewing a game software, a limitation is set to the number of times of posting, and the number of times of posting is checked by the game apparatus 3 and the server 9. Even if data of the number of times of posting within the game apparatus 3 is manipulated, posting become invalid by checking and limiting the number of times of posting by the server 9. Thus, intentional mass posting is prevented, there by improving reliability of reviewing (posting). In the game apparatus 3, the game softwares which have been posted are excluded from the list of the postable game softwares, and hence the limitation to the number of times of posting is notified to the player in advance, thereby preventing the player from uselessly performing posting operations. It is noted that the posted game software may not be excluded from the list but may be displayed in the list, and an indication (a mark "posted", a grayed out indication, or the like) which shows that the game software has been posted may be provided so that a selection operation for the game software is not accepted. Even in this case, the player is notified that the game software has been posted and the limitation is set to the number of times of posting.

In the embodiment described above, a game software (a game program) which has been played by the player for a total play time is equal to or longer than the predetermined time becomes postable, and a reviewable review target is extracted based on an execution history of the game software. Alternatively, a review target may be extracted based on another execution history. For example, a game program which has been played by the player a number of play times which is equal to or larger than a predetermined number of times may become postable. In this case, instead of a total play time, a total number of play times is described in the posting transmission information Itp, and transmitted to the server 9. As described above, a threshold value of the execution history is set so as to assume a level which can obtain credibility of reviewing, and a review target which exceeds the threshold value becomes reviewable, thereby improving reliability of reviewing the review target.

Alternatively, a review target may be extracted based on an execution history of an extent to which the game program has been played by the player. As a first example, each game program as a posting target may be set in advance so that the game program which has been played by the player until a fixed midstream time point before clearing a game becomes postable. For example, when a player character reaches a predetermined spot in a virtual game space shown by executing the game program, or when a predetermined stage is cleared or failed, the executed game program sets a flag to be postable. The same processing as the above posting limitation can be executed by regarding a state of the flag as a determination criterion. Converting into a total play time, the flag which is set for each game program as a posting target is set to a spot in the virtual game space or a stage which are reached for the above predetermined time (e.g. one hour) to be postable, thereby achieving ease and reliability of reviewing (posting).

As a second example, a process from a time when the player starts playing a game program to a time when a game is cleared is regarded as an entire process, an extent with respect to the entire process to which the game program has been played by the player is described as an execution history, and a reviewable game program is extracted based on the execution history. Converting into a total play time, an extent of the game program (e.g. 10 percent of the above entire process) which corresponds to the above predetermined time to be postable is regarded as a threshold value, thereby achieving ease and reliability of reviewing (posting).

In the embodiment described above, the game apparatus 3 extracts game softwares as a review target based on the total play time, or based on the execution history. Alternatively, the server 9 may extract review targets based on the execution history. For example, a total play time of each game software in the game apparatus 3 is transmitted to the server 9. Then, the server 9 extracts postable game softwares for the game apparatus 3 as a transmission source similarly to the step 82, and transmits data indicating the list to the game apparatus 3. This provides a review system in which the server 9 extracts a review target based on an execution history.

As described above, the game software code (a product code) is used as a code indicating a type of game software in an example of data used in the posting processing. Alternatively, another code indicating a type of game software may be used. For example, an initial code indicating a type of game software may be used to be distinguished from codes of the other game softwares.

As described above, the breakdown of the play times at each time of posting by posters is graphed out in the posting breakdown screen (see FIG. 25). Thus, a viewer of the posting breakdown screen can determine after how long the game software has been played the posted contents are made. However, in the case where such an effect is not desired, when the total play time administrated by the game apparatus 3 reaches a predetermined time (or a threshold value of an execution history assuming a level which can obtain reliability of reviewing, e.g. one hour) which allows a review target to be reviewable, an accumulation processing of the play time may not be executed further. In this case, predetermined data indicating that the total play time is equal to or larger than the predetermined time may be described at the total play times in the posting list Lpos (see FIG. 11) and the posting transmission information Itp (see FIG. 12). The total play time may be deleted in the posting transmission information Itp, information on the total play time of the game apparatus 3 may not be transmitted to the server 9. This simplifies administration of the play time in the game apparatus 3 and streamlines the processing.

As described above, the "play time" of the play history file Fph stored in the play history file data Dc is updated every the second time. For example, in the case where the flash memory 17 is composed of a NAND flash and the like and data of a play history file Fpc is stored in the flash memory 17, frequency of the update of the data is reduced thereby to prevent the flash memory 17 from deteriorating. However, in the case where such an effect is not desired, the "play time" of the play history file Fph may be updated in real time as time elapses.

In the embodiment described above, a limitation is set to a number of times of posting, and only one posting with respect to the identical game software from the identical game apparatus 3 is allowed. Alternatively, a limitation may be set to a number of times of posting in another mode. For example, a unique code is set to each player of the game apparatus 3, and only one posting with respect to the identical software from the identical player may be allowed. In this case, the code of the player which plays the game software is also described in the play history file Fph in the game apparatus 3, and the total play time and the posted flag are administrated for each player. Then, the server 9 describes a combination of the posting player (the code of the player) and the game software (the game software code) as a posting target in the posting history list for each posting, so that the limitation can be set to the number of times of posting for each player.

In the processing described above, the play history file Fph which is created and stored every time the game software processing is executed is accumulated at the time of starting the channel processing to update the posting list Lpos (see the step 62). However, the play history file Fph may be accumulated at another timing. For example, at the time of starting the menu set in the game apparatus main body 5 (see the step 41), a play time of the play history file Fph which has not been accumulated may be accumulated for each game software, and a temporal file may be created and stored until update of the posting list Lpos. In this case, the update processing (step 62) of the posting list Lpos is executed using the temporal file which has not been reflected.

As the data (the ranking data, the software posting breakdown data, the posting target full list, and the like) which is exhibited in the game apparatus 3 by the server 9, data updated by each processing is instantly exhibited. However, the data may be exhibited in another mode. For example, an exhibition folder which is exhibited in the game apparatus 3 and an exhibition preparation folder which is not exhibited are provided in the storage unit of the server 9, data updated by each processing is stored in the exhibition preparation folder for each updating. At a predetermined time of exhibiting data, data in the exhibition folder is updated using the data stored in the exhibition preparation folder. This reduces frequency of updating data to be exhibited, and also reduces frequency of download by the game apparatus 3.

In the above-described processing of the server 9, the ranking data and the software posting breakdown data are created by storing the posting transmission information Itp for the certain period and executing the batch processing thereon. However, the ranking data and the software posting breakdown data may be created at another processing period. For example, every time the valid posting transmission information Itp is obtained, the ranking data and the software posting breakdown data may be created using the posting transmission information Itp.

In the embodiment described above, the game program stored in the optical disc 4 is a review target, and a reviewable game program is extracted based on a history of an execution time and a number of times of execution of the game program. However, another medium may be a review target. For example, various application programs such as a common information processing program, a browser, and the like) may be a review target. A program as a review target may be stored in a nonvolatile semiconductor memory in addition to an optical disc-shaped storage medium such as CD-ROM, DVD, and the like. A program as a review target may be supplied to the game apparatus main body 5 through a wired or wireless communication line in addition to through an external storage medium, or may be stored in advance in a nonvolatile storage unit within the game apparatus main body 5.

Music data, video data, electronic book data, still image (picture) data, and the like may be a review target of the present invention. For example, music data, video data, electronic book data, and still image data which are stored in the external storage medium, supplied to the game apparatus main body 5 through a wired or wireless communication line, or stored in advance in the nonvolatile storage unit within the game apparatus main body 5 are the review target. In this case, the game apparatus main body 5 executes processing of playing the music data, the video data, the electronic book data, the still image data, and the like, and reviewable music data, video data, electronic book data, and still image data are extracted based on the execution history.

Further, a website which is browsable from the game apparatus main body 5 through a network may be a review target of the present invention. For example, each website (e.g. a shopping site, a news site, a weather site, and the like) which is accessible to the game apparatus main body 5 through a network is the review target. In this case, the game apparatus main body 5 executes processing of browsing each website, and a reviewable website is extracted based on the execution history (an execution time, a number of times of execution, and the like).

In the above description, the present invention is applied to the stationary game apparatus main body 5 which executes processing according to operations with respect to the controller 7. However, the present invention is applicable to a hand-held game apparatus. For example, the above processing is executed according to operation with respect to an operation button provided to a main body of the hand-held game apparatus. Such application of the present invention provides the information processing of the present invention for the hand-held game apparatus.

In the above description, the present invention is applied to the stationary and hand-held game apparatuses. However, the present invention is applicable to an information processing device such as a commonly personal computer, and the like, which is operated with an input device, and a portable information processing device. The portable information processing device includes a commonly personal computer, a cell phone, a PDA (Personal Distal Assistant), and the like.

In the above description, the controller 7 and the game apparatus main body 5 are connected by radio communication. However, the controller 7 and the game apparatus main body 5 may be electrically connected through a cable. In this case, the cable connected to the controller 7 is connected to a connecting terminal of the game apparatus main body 5.

The shape of the controller 7, and the shape, the number and the position of the operation section 72 provided thereon in the above description are merely an example. Even though another shape of the controller 7, another number and another position of the operation section 72 are practiced, the present invention may be achieved. Determining values and display forms used in the above processing are merely an example. Even though other determining values and other display forms are used, the present invention may be achieved.

The information processing program of the present invention is supplied to the game apparatus main body 5 through an external storage medium such as the optical disc 4 and the like but may be supplied to the game apparatus main body 5 through a wired or wireless communication line. The information processing program may be stored in a non-volatile storage unit within the game apparatus main body 5. It is noted that the information storage medium for storing the information processing program may be a nonvolatile semiconductor memory in addition to an optical disc-shaped storage medium such as CD-ROM, DVD, and the like.

The information processing device, the information processing system, and the storage medium storing the information processing program according to the present invention achieve ease and reliability of reviewing a review target, and are useful as a device, a system, and a program for executing various processings.

While the invention has been described in detail, the foregoing description is in all aspects illustrative and not restrictive. It is understood that numerous other modifications and variations can be devised without departing from the scope of the invention.

What is claimed is:

1. An information processing system, comprising:
a processing system including one or more processors, the processing system configured to at least:
execute, in accordance with an operation of a user, execution processing of a review target;
update and store an execution history of the review target in accordance with the execution processing of the review target;
determine when the review target is reviewable by the user by comparing the stored execution history of the review target to one or more conditions;
generate, in accordance with an operation of the user, review information indicating a result of review performed by the user on the review target that has been determined as reviewable; and
accumulate the generated review information.

2. The information processing system according to claim 1, wherein
the execution history of the review target is updated and stored in accordance with an execution time for the execution processing of the review target, and
a review target is determined as the reviewable review target when the stored execution time of which has reached a specified time.

3. The information processing system according to claim 1, wherein
the execution history of the review target is updated and stored in accordance with a number of execution times of the execution processing of the review target, and
a review target is determined as the reviewable review target when the number of stored execution times of which has reached a specified number of times.

4. The information processing system according to claim 1, wherein
the execution history of the review target is updated and stored in accordance with an extent to which the execution processing of the review target has executed, and
a review target is determined as the reviewable review target when the extent of which has reached a specified extent.

5. The information processing system according to claim 1, wherein the processing system further configured to:
distinguish the review target, the review information of which has been accumulated as a reviewed target, and
extract the reviewable review target from a plurality of review targets except the reviewed target.

6. The information processing system according to claim 5, wherein the processing system further configured to:
receive a review acceptance list describing a review target, review information of which is to be accepted, and
extract a review target, which is described in the review acceptance list and which is not the reviewed target, from the plurality of review targets, the reviewable review target is extracted from the extracted review target based on the execution history of each review target.

7. The information processing system according to claim 1, wherein the processing system further configured to display the review target on a display to prompt the user to make a selection from the displayed review target.

8. The information processing system according to claim 1, wherein the review information is generated so as to include the execution history of the review target which has been stored at the time of generating the review information of the review target.

9. An information processing system comprising a server, having a processing system including one or more processors, and a plurality of information processing devices which perform data communication through a network for transmitting a result of reviewing a review target from at least one information processing device to the server, the at least one information processing device comprising:
a processing system including one or more processors, the processing system configured to:
execute, in accordance with an operation of a user, execution processing of a review target, and
update and store an execution history of the review target in accordance with the execution processing of the review target, the processing system of the at least one information processing device and the processing system of the server configured to:
determine when the review target is reviewable by the user by comparing the stored execution history of the review target to one or more conditions, the processing system of the at least one information processing device further configured to:
generate, in accordance with an operation of the user, review information indicating a result of review performed by the user on the review target that has been determined as reviewable, and the at least one information processing device further comprising a client side transmission device configured to transmit to the server the generated review information, the server comprising:
a server side receiving device configured to receive the review information transmitted from the at least one information processing device,
the processing system of the server further configured to accumulate the review information received by the server side receiving device, and exhibit data indicating a result of the accumulation to the at least one information processing device.

10. The information processing system according to claim 9, wherein
the review information is generated so as to include an identification code which identifies the at least one information processing device,
the server further comprises:
a review history storage device configured to store a review history list which describes at least a combination of the review target of the review information received by the server side receiving device and the identification code included in the review information, the processing system of the server further configured to:
determine whether the combination of the review target of the review information received by the server side receiving device and the identification code included in the review information is included in the review history list;
accept the review information received by the server side receiving device when the combination is not included in the review history list, and refuse the review information received by the server side receiving device when the combination is included in the review history list;
accumulate the accepted review information; and
exhibit data indicating a result of the accumulation to the at least one information processing device.

11. The information processing system according to claim 9, wherein the review information is generated so as to include the execution history of the review target which has been stored at the time of generating the review information of the review target, and
along with the result of the accumulation, data indicating a result of accumulating the execution history included in each review information which leads the result of the accumulation is exhibited to the information processing device.

12. The information processing system according to claim 9, wherein
a review acceptance list which describes a review target is configured to be updated and administered as appropriate, review information of which is to be accepted by the server, and
the review target described in the review acceptance list is extracted from a plurality of review targets, and the reviewable review target is extracted from the extracted review target based on the execution history of each review target.

13. A non-transitory storage medium storing an information processing program executed by a computer of a device, the information processing program, when executed, causing the computer to perform functions comprising:
executing, in accordance with an operation of a user, execution processing of a review target;
updating and storing in a memory an execution history of the review target in accordance with the execution processing of the review target;
determining when the review target is reviewable by the user by comparing the execution history of the review target to one or more conditions;
generating, in accordance with operation of the user, review information indicating a result of review performed by the user on the review target that has been determined as reviewable; and
accumulating the generated review information.

14. A method implemented by an information processing apparatus having one or more processors, the method comprising:
executing, in accordance with an operation of a user, execution processing of a review target using the one or more processors;
updating and storing in a memory an execution history of the review target in accordance with the execution processing of the review target;
determining when the review target is reviewable by the user by comparing the execution history of the review target to one or more conditions;
generating, in accordance with operation of the user, review information indicating a result of review performed by the user on the review target that has been determined as reviewable; and
accumulating the generated review information.

15. The information processing system according to claim 1, wherein when the stored execution history of the review target satisfies one or more criteria, the review target is determined as being reviewable by the user.

16. The information processing system according to claim 1, wherein whether it is possible to transmit a result of reviewing the review target to a server is determined based on the stored execution history of the review target.

17. The information processing system according to claim 1, wherein
whether the stored execution history of the review target satisfies a criterion is determined, and when a result of the determination is positive, the review information indicating a result of review performed by the user on the review target is generated in accordance with an operation of the user, and when a result of the determination is negative, the review information indicating a result of review performed by the user on the review target is not generated.

18. The information processing system according to claim 1, wherein the one or more conditions are at least one of a game software which has been played by the user for a total play time that is equal to or longer than a predetermined time, a game software that has not been posted until a present time, or a game software which is included in an obtained posting target full list.

19. The information processing stem according to claim 1, wherein the one or more conditions are a total execution time with respect to a time threshold.

20. The information processing system according to claim 1, wherein the review target becomes reviewable when a total time of execution of the review target is equal to or greater than a time threshold.

21. An information processing system, comprising:
a processing system including one or more processors, the processing system configured to at least:
 execute, in accordance with an operation of a user, execution processing of a review target;
 update and store an execution history of the review target in accordance with the execution processing of the review target;
 determine when the review target is reviewable by the user by comparing the stored execution history of the review target to one or more conditions; and
 obtain review information indicating a result of review performed by the user on the review target that has been determined as reviewable.

22. An information processing system, comprising:
a processing system including one or more processors, the processing system configured to at least:
 execute, in accordance with an operation of a user, execution processing of a review target;
 update and store an execution history of the review target in accordance with the execution processing of the review target;
 determine when review of the review target by the user is valid by comparing the stored execution history of the review target to one or more conditions; and
 obtain review information indicating a result of review, performed by the user on the review target, that has been determined as valid.

* * * * *